(12) United States Patent
Yoon et al.

(10) Patent No.: US 10,958,836 B2
(45) Date of Patent: Mar. 23, 2021

(54) IMAGE CAPTURING APPARATUS AND CONTROL METHOD THEREOF

(71) Applicant: SAMSUNG ELECTRONICS CO., LTD., Suwon-si (KR)

(72) Inventors: Seung-il Yoon, Yongin-si (KR); Dong-wook Kim, Suwon-si (KR); Hyun-kyu Yun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 773 days.

(21) Appl. No.: 15/409,108

(22) Filed: Jan. 18, 2017

(65) Prior Publication Data

US 2017/0214852 A1    Jul. 27, 2017

(30) Foreign Application Priority Data

Jan. 21, 2016    (KR) .................. 10-2016-0007573

(51) Int. Cl.
*H04N 5/232* (2006.01)
*H04N 7/18* (2006.01)
(Continued)

(52) U.S. Cl.
CPC ... *H04N 5/232411* (2018.08); *H04N 5/23206* (2013.01); *H04N 5/23216* (2013.01);
(Continued)

(58) Field of Classification Search
CPC ...... G02B 2027/014; G02B 2027/0174; G02B 2027/0178; G02B 2027/0187;
(Continued)

(56) References Cited

U.S. PATENT DOCUMENTS 8,667,167 B2 *  3/2014  Fang ............... H04L 47/263
                                              709/233
9,763,275 B2 *  9/2017  Park ................ H04W 76/10
(Continued)

FOREIGN PATENT DOCUMENTS

CN    103339650    10/2013
CN    103716583    4/2014
(Continued)

OTHER PUBLICATIONS

International Search Report dated May 23, 2017 in corresponding International Patent Application No. PCT/KR2017/000675.
(Continued)

*Primary Examiner* — Dave Czekaj
*Assistant Examiner* — Kehinde Abimbola
(74) *Attorney, Agent, or Firm* — Staas & Halsey LLP

(57) ABSTRACT

An image capturing apparatus includes: a sensor; a camera; an image processor; a first communicator operatable in one between a first status and a second status that consumes less power than the first status; a second communicator having a lower data transmission rate than the first communicator; and a controller configured to make a request for whether to take an image with the camera to an external apparatus through the second communicator if the sensor senses an object while the first communicator is in the second status, control the image processor to generate the data of the image taken by the camera in response to an instruction received by the second communicator, and control the first communicator to switch over to the first status so that the data of the image are transmitted to the external apparatus through the first communicator.

20 Claims, 27 Drawing Sheets

(51) Int. Cl.
*H04N 21/443* (2011.01)
*H04N 21/258* (2011.01)
*H04N 21/4223* (2011.01)
*H04N 21/4363* (2011.01)

(52) U.S. Cl.
CPC ..... *H04N 5/23241* (2013.01); *H04N 5/23293* (2013.01); *H04N 5/232933* (2018.08); *H04N 5/232941* (2018.08); *H04N 7/183* (2013.01); *H04N 21/25841* (2013.01); *H04N 21/4436* (2013.01); *H04N 5/23245* (2013.01); *H04N 21/4223* (2013.01); *H04N 21/43637* (2013.01)

(58) Field of Classification Search
CPC ............ G02B 27/0093; G02B 27/0172; G02B 27/0179; G02B 27/646; G02B 7/08; H04N 5/23241; H04N 5/23293; H04N 21/4223; H04N 5/23245; H04N 7/183; H04N 21/25841; H04N 21/43637; H04N 21/4436; H04N 5/23206; H04N 5/23216; H04N 5/04; H04N 2201/006
See application file for complete search history.

(56) References Cited

U.S. PATENT DOCUMENTS

| | | | |
|---|---|---|---|
| 2006/0256959 A1* | 11/2006 | Hymes | H04M 1/26 |
| | | | 379/433.04 |
| 2011/0238300 A1 | 9/2011 | Schenken | |
| 2012/0309413 A1 | 12/2012 | Grosman et al. | |
| 2013/0138830 A1* | 5/2013 | Fang | H04L 47/263 |
| | | | 709/233 |
| 2013/0178163 A1 | 7/2013 | Wang | |
| 2014/0098286 A1 | 4/2014 | Kannermark et al. | |
| 2014/0333766 A1 | 11/2014 | Enohara et al. | |
| 2015/0044970 A1* | 2/2015 | Park | H04W 76/10 |
| | | | 455/41.2 |
| 2015/0109437 A1* | 4/2015 | Yang | H04N 7/183 |
| | | | 348/143 |
| 2015/0130935 A1 | 5/2015 | Siann et al. | |
| 2015/0138353 A1* | 5/2015 | Yang | H04M 11/025 |
| | | | 348/143 |
| 2015/0381874 A1 | 12/2015 | Wu et al. | |
| 2017/0164415 A1* | 6/2017 | Sato | H04W 76/10 |
| 2018/0005465 A1* | 1/2018 | Truong | H04W 4/80 |

FOREIGN PATENT DOCUMENTS

| | | |
|---|---|---|
| JP | 2003-46993 | 2/2003 |
| JP | 2003-134502 | 5/2003 |
| KR | 10-2009-0112979 | 10/2009 |
| KR | 10-2010-0012152 | 2/2010 |
| KR | 10-0981186 | 9/2010 |
| KR | 10-1496730 | 2/2015 |

OTHER PUBLICATIONS

Partial European Search Report dated Jul. 4, 2018 in European Patent Application No. 17741675.7.
Extended European Search Report dated Aug. 6, 2018 in European Patent Application No. 17741675.7.
"Geofence to automatically enable/disable motion sensing", XP055495679, Jan. 5, 2016, URL:<https://community.netgear.com/t5/ArloIdea-Exchange/Geofence-to-automatically-enable-disable-motion-sensing/idi-p/1028474>, 7 pages.
European Communication dated Mar. 13, 2020 in European Patent Application No. 17741675.7.
Chinese Office Action dated Mar. 16, 2020 in Chinese Patent Application No. 201780004725.X.
European Communication dated Feb. 2, 2021 in European Patent Application No. 17741675.7.

* cited by examiner

FIG. 8

| MODE | ACTIVATION OF ELEMENTS | | |
|---|---|---|---|
| | FIRST COMMUNICATOR | SECOND COMMUNICATOR | IMAGE PROCESSOR |
| STANDBY MODE | X | X | X |
| NOTIFICATION MODE | X | ○ | X |
| IMAGE CAPTURE MODE | X | ○ | ○ |
| IMAGE STREAMING MODE | ○ | ○ | ○ |

( ○ : ACTIVATED, X : INACTIVATED)

FIG. 14

| MODE | SECOND COMMUNICATOR | | | IMAGE PROCESSOR | | | FIRST COMMUNICATOR | | | Total (mA) |
|---|---|---|---|---|---|---|---|---|---|---|
| | Status | Current (mA) | Voltage (V) | Status | Current (mA) | Voltage (V) | Status | Current (mA) | Voltage (V) | |
| STANDBY MODE | S | 0.0019 | 3.6 | S | 0.01 | 3.3 | S | 0.00026 | 3.3 | 0.01 |
| NOTIFICATION MODE | A | 31.5 | 3.6 | S | 0.01 | 3.3 | S | 0.00026 | 3.3 | 34.37 |
| IMAGE CAPTURE MODE | A | 8.5 | 3.6 | A | 150 | 3.3 | S | 0.00026 | 3.3 | 159.27 |
| IMAGE STREAMING MODE | A | 8.5 | 3.6 | A | 150 | 3.3 | A | 300 | 3.3 | 459.27 |

FIG. 22

| MODE | STATUS OF ELEMENTS | |
|---|---|---|
| | COMMUNICATOR | IMAGE PROCESSOR |
| STANDBY MODE | INACTIVATED | INACTIVATED |
| NOTIFICATION MODE | ZIGBEE BASED COMMUNICATION MODE | INACTIVATED |
| IMAGE CAPTURE MODE | ZIGBEE BASED COMMUNICATION MODE | ACTIVATED |
| IMAGE STREAMING MODE | WI-FI BASED COMMUNICATION MODE | ACTIVATED |

IMAGE CAPTURING APPARATUS AND CONTROL METHOD THEREOF

CROSS-REFERENCE TO RELATED APPLICATIONS

This application claims benefit of foreign priority from Korean Patent Application No. 10-2016-0007573 filed on Jan. 21, 2016 in the Korean Intellectual Property Office, the disclosure of which is incorporated herein by reference.

BACKGROUND

1. Field

Apparatuses and methods consistent with the exemplary embodiments relate to an image capturing apparatus and a control method thereof, in which a predetermined object or an object body is photographed by a camera to generate photographed image data or capture image data and the photographed image data is provided to an external device so that the external device can display a photographed image based on the photographed image data, and more particularly to a wireless image capturing apparatus with a battery, which has an improved structure for reducing consumption of battery power, and a control method thereof.

2. Description of the Related Art

To compute and process predetermined information in accordance with certain processes, an electronic apparatus basically includes a central processing unit (CPU), a chipset, a memory, and the like electronic components for computation. Such an electronic apparatus may be classified variously in accordance with what information will be processed therein. For example, the electronic apparatus is classified into an information processing apparatus such as a personal computer, a server or the like for processing general information, and an image processing apparatus for processing image information.

The image processing apparatus receives a content signal including image data from the exterior and processes the image data extracted from the content signal in accordance with various image processing processes. The image processing apparatus may display an image based on the processed image data on its own display panel, or output the processed image data to another display apparatus provided with a panel so that the corresponding display apparatus can display an image based on the processed image signal. In particular, the image processing apparatus that has a display panel is called a display apparatus, and may for example includes a TV, a monitor, a portable multimedia player (PMP), a tablet computer, a mobile phone, etc. Further, the image processing apparatus includes an image providing apparatus for providing image data to another image processing apparatus such as a TV. The image providing apparatus is classified into many kinds in accordance with how to generate the image data. As one kind of the image providing apparatus, there is an image capturing apparatus that includes a camera, photographs a predetermined object through the camera and generates and provides the photographed image.

The image capturing apparatus may be used for prevention of crimes like a closed-circuit television (CCTV) as well as the function of the camera since it photographs an object and generates the photographed image. The image capturing apparatus needs supply of power to operate, and a communication path is needed for transmitting the photographed image data between the image capturing apparatus and the display apparatus so that the photographed image generated by the image capturing apparatus can be displayed on an external display apparatus. Conventionally, a cable has been used for supplying the power and transmitting the data as it is connected to the image capturing apparatus. In such a conventional case, if the image capturing apparatus is used as the CCTV, its installation place may be variously restricted. To solve such a restriction, wireless communication and a built-in battery may be applied to the image capturing apparatus.

By the way, if the image capturing apparatus receives power from the built-in battery, consumption of battery power becomes a big issue. If the image capturing apparatus is installed at a place difficult for a user to reach, the battery has to supply power for as long as possible in order to increase its replacement cycle. Accordingly, for convenience of a user, there is a need of applying a structure or method of reducing wasteful power consumption to the image capturing apparatus.

SUMMARY

An image capturing apparatus including: a sensor configured to sense an object; a camera configured to take an image; an image processor configured to process data of an image taken by the camera; a first communicator configured to communicate with an external apparatus and operate in one between a preset first status and a second status that consumes less power than the first status; a second communicator configured to communicate with the external apparatus and have a lower data transmission rate than the first communicator; and a controller configured to make a request for whether to take an image with the camera to the external apparatus through the second communicator when the sensor senses an object while the first communicator is in the second status, control the image processor to generate the data of the image taken by the camera in response to an image taking instruction received from the external apparatus through the second communicator, and control the first communicator to switch over to the first status so that the data of the image taken by the camera can be transmitted to the external apparatus through the first communicator. Thus, it is possible to reduce consumption of battery power in the image capturing apparatus by minimizing time during which the first communicator operates in the first status.

The controller may activate the first communicator in the first status, but may inactivate the first communicator in the second status.

The image processor may operate in one between a preset third status and a fourth status that consumes less power than the third status, and may be in the fourth status while the camera does not take an image. Thus, it is possible to reduce the power consumption of the image processor since the image processor is in the fourth status while operating without the image data.

The controller may activate the image processor in the third status, but may inactivate the image processor in the fourth status.

The image capturing apparatus may further including a the storage, wherein and the controller may keep the first communicator in the second status in response to the image taking instruction, and may control the image processor to switch over to the third status, may generate the data of the image taken by the camera and may store the generated data in the storage. Thus, the status of the image processor is selectively controlled corresponding to the photographing operation of the camera, and it is thus possible to reduce the power consumption of the image processor.

The controller may control the first communicator to switch over to the first status when the image data is completely stored in the storage, so that the image data stored in the storage can be transmitted to the external apparatus through the first communicator. Thus, the first communicator operates in the first status only for the minimum period of time for transmitting the image data, and it is thus possible to reduce the power consumption of the first communicator.

The controller may control the first communicator to switch over to the second status and the image processor to switch over to the fourth status when the image data is completely transmitted through the first communicator. Thus, it is possible to minimize the wasteful power consumption while the camera does not take an image.

The second communicator may operate in one between a preset fifth status and a sixth status that consumes less power than the fifth status, the controller may keep the second communicator in the sixth status while the sensor does not sense the object, and may control the second communicator to switch over to the fifth status when the sensor senses the object. Thus, it is thus possible to reduce the power consumption of the second communicator.

The controller may activate the second communicator in the fifth status, but may inactivate the second communicator in the sixth status.

The controller may control the second communicator to switch over to the sixth status if the instruction to the request is not received within a preset period of time.

The first communicator may include a Wi-Fi communication module, and the second communicator may include a Zigbee communication module.

A system including: an image capturing apparatus configured to photograph an object; and a display apparatus configured to display an image by processing image data obtained by photographing the object and received from the image capturing apparatus, the image capturing apparatus including: a sensor configured to sense the object; a camera configured to take an image; an image processor configured to process data of an image taken by the camera; a first communicator configured to communicate with an external apparatus and operate in one between a preset first status and a second status that consumes less power than the first status; a second communicator configured to communicate with the external apparatus and have a data transmission rate lower than the first communicator; and a controller configured to make a request for whether to take an image by the camera to the external apparatus through the second communicator in response to an object sensed by the sensor while the first communicator is in the second status, control the image processor to generate the data of the image taken by the camera in response to an image taking instruction received from the external apparatus through the second communicator, and control the first communicator to switch over to the first status so that the data of the image taken by the camera can be transmitted to the external apparatus through the first communicator. Thus, the first communicator minimizes the time of operating in the first status, and it is thus possible to reduce the consumption of the built-in battery power in the image capturing apparatus.

The display apparatus may determine whether the display apparatus is located within an installation zone of the image capturing apparatus in response to the request from the image capturing apparatus, an instruction to approve of the request may be transmitted to the image capturing apparatus if it is determined that the display apparatus is located within the installation zone, and a user interface (UI) may be displayed for allowing a user to select whether to approve of the request if it is determined that the display apparatus is not located within the installation zone. Thus, the display apparatus can automatically respond to the image capturing apparatus's request for approval of taking an image under a specific condition without a user's input.

The display apparatus may determine that the display apparatus is located within the installation zone if a service set identifier (SSID) of an access point (AP) installed within the installation zone for communication with the image capturing apparatus is searched. Thus, it is easy to determine whether the display apparatus is currently located within the installation zone of the image capturing apparatus.

The display apparatus may previously store flag information designed for whether to approve of the request for taking an image, and may selectively send the image capturing apparatus an instruction to approve of taking an image based on the flag information in response to the request. Thus, the display apparatus can automatically respond to the image capturing apparatus's request for approval of taking an image under a specific condition without a user's input.

A method of controlling an image capturing apparatus, the method including: sensing an object by a sensor while a first communicator is in a second status between a preset first status and the second status that consumes less power than the first status; making a request for whether to take an image with a camera to an external apparatus through a second communicator having a lower data transmission rate than the first communicator when the sensor senses the object; controlling an image processor to generate the data of the image taken by the camera in response to an image taking instruction received from the external apparatus through the second communicator; and switching the first communicator over to the first status so that the data of the image taken by the camera can be transmitted to the external apparatus through the first communicator. Thus, the first communicator minimizes the time of operating in the first status, and it is thus possible to reduce the consumption of the built-in battery power in the image capturing apparatus.

The first communicator may be activated in the first status, but inactivated in the second status.

The image processor may operate in one between a preset third status and a fourth status that consumes less power than the third status, and may be in the fourth status while the camera does not take an image. Thus, the image processor is in the fourth status while the camera does not take an image, and it is possible to reduce the power consumption of the image processor.

The image processor may be activated in the third status, but inactivated in the fourth status.

The controlling the image processor to generate the image data may include keeping the first communicator in the second status in response to the image taking instruction, and controlling the image processor to switch over to the third status, generate the data of the image taken by the camera and store the generated data in the storage. Thus, the status of the image processor is selectively controlled corresponding to the photographing operation of the camera, and it is thus possible to reduce the power consumption of the image processor.

BRIEF DESCRIPTION OF THE DRAWINGS

The above and/or other aspects will become apparent and more readily appreciated from the following description of exemplary embodiments, taken in conjunction with the accompanying drawings, in which:

FIG. 8 illustrates a plurality of modes for the image capturing apparatus according to the second exemplary embodiment, and activated statuses of elements in the image capturing apparatus according to the modes;

FIG. 14 is a table showing current consumption according to the modes in the image capturing apparatus according to the second exemplary embodiment;

FIG. 22 illustrates a plurality of modes for the image capturing apparatus according to the sixth exemplary embodiment, and activated statuses of elements in the image capturing apparatus according to the modes;

DESCRIPTION OF EMBODIMENTS

Below, exemplary embodiments will be described in detail with reference to accompanying drawings. The following descriptions of the exemplary embodiments are made by referring to elements shown in the accompanying drawings, in which like numerals refer to like elements having substantively the same functions.

In the description of the exemplary embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the idea of the invention.

Further, the exemplary embodiments will describe only elements directly related to the idea of the invention, and description of the other elements will be omitted. However, it will be appreciated that the elements, the descriptions of which are omitted, are not unnecessary to realize the apparatus or system according to the exemplary embodiments. In the following descriptions, terms such as "include" or "have" refer to presence of features, numbers, steps, operations, elements or combination thereof, and do not exclude presence or addition of one or more other features, numbers, steps, operations, elements or combination thereof.

Further, the embodiments respectively described with reference to the accompanying drawings are not exclusive to each other unless otherwise mentioned, and a plurality of embodiments may be selectively combined within one apparatus. The combination of these plural embodiments may be discretionally selected and applied to realize the present inventive concept by a person having an ordinary skill in the art.

Figure 1:
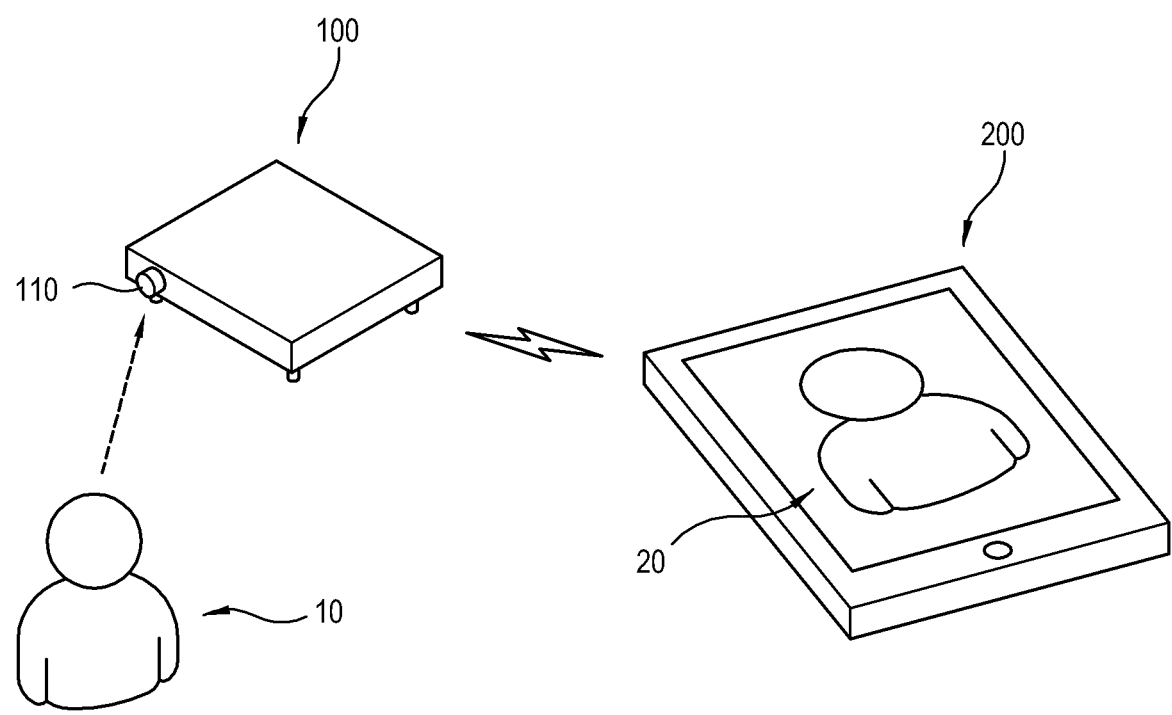
FIG. 1 illustrates a system according to a first exemplary embodiment.

FIG. 1 illustrates a system according to a first exemplary embodiment.

As shown in FIG. 1, the system according to the first exemplary embodiment includes an image capturing apparatus 100 which photographs a predetermined object 10 and generates photographed image data, and a display apparatus 200 which processes the photographed image data generated by the image capturing apparatus 100 and displays a photographed image 20. In this exemplary embodiment, the image capturing apparatus 100 and the display apparatus 200 are wirelessly connected by one to one, but not limited thereto. Alternatively, a separate relay (not shown) may be provided in establishing a communication network between the image capturing apparatus 100 and the display apparatus 200.

The image capturing apparatus 100 includes a camera 110 for photographing the object 10. Thus, the image capturing apparatus 100 photographs or captures the object 10 through the camera 110 in response to a preset event, and generates the photographed image data in accordance with photographing results of the camera 110. The image capturing apparatus 100 in this embodiment has a wireless structure of receiving power from a built-in battery (not shown) and transmitting the photographed image data to the display apparatus 200 in accordance with wireless communication protocols.

The display apparatus 200 processes the photographed image data received from the image capturing apparatus 100 and displays the photographed image 20. There are no limits to the kind of display apparatus 200 as long as it is an electronic apparatus having a display panel to display the photographed image. For example, the display apparatus 200 may be an apparatus stationarily installed at a certain place like a TV, or may be a portable apparatus freely carried by a user like a mobile phone or a tablet computer. In this exemplary embodiment, the display apparatus 200 is achieved by a portable mobile apparatus.

The wireless network between the image capturing apparatus 100 and the display apparatus 200 may be established by applying various protocols. By the way, if a physical distance between the image capturing apparatus 100 and the display apparatus 200 is long, the image capturing apparatus 100 and the display apparatus 200 may communicate with each other through a wide area network rather than one-to-one direct connection. Since the photographed image data is transmitted between the image capturing apparatus 100 and the display apparatus 200, the wireless protocol has to guarantee a transmission speed for supporting this transmission. As an example of the protocol for satisfying such a condition, there is a wireless fidelity (Wi-Fi). Wi-Fi is a protocol of supporting IEEE 802.11-based wireless LAN connection and PAN/LAN/WAN configuration. If Wi-Fi is based on IEEE 802.11n, it guarantees the maximum transmission speed of 300 Mbps.

Figure 2:
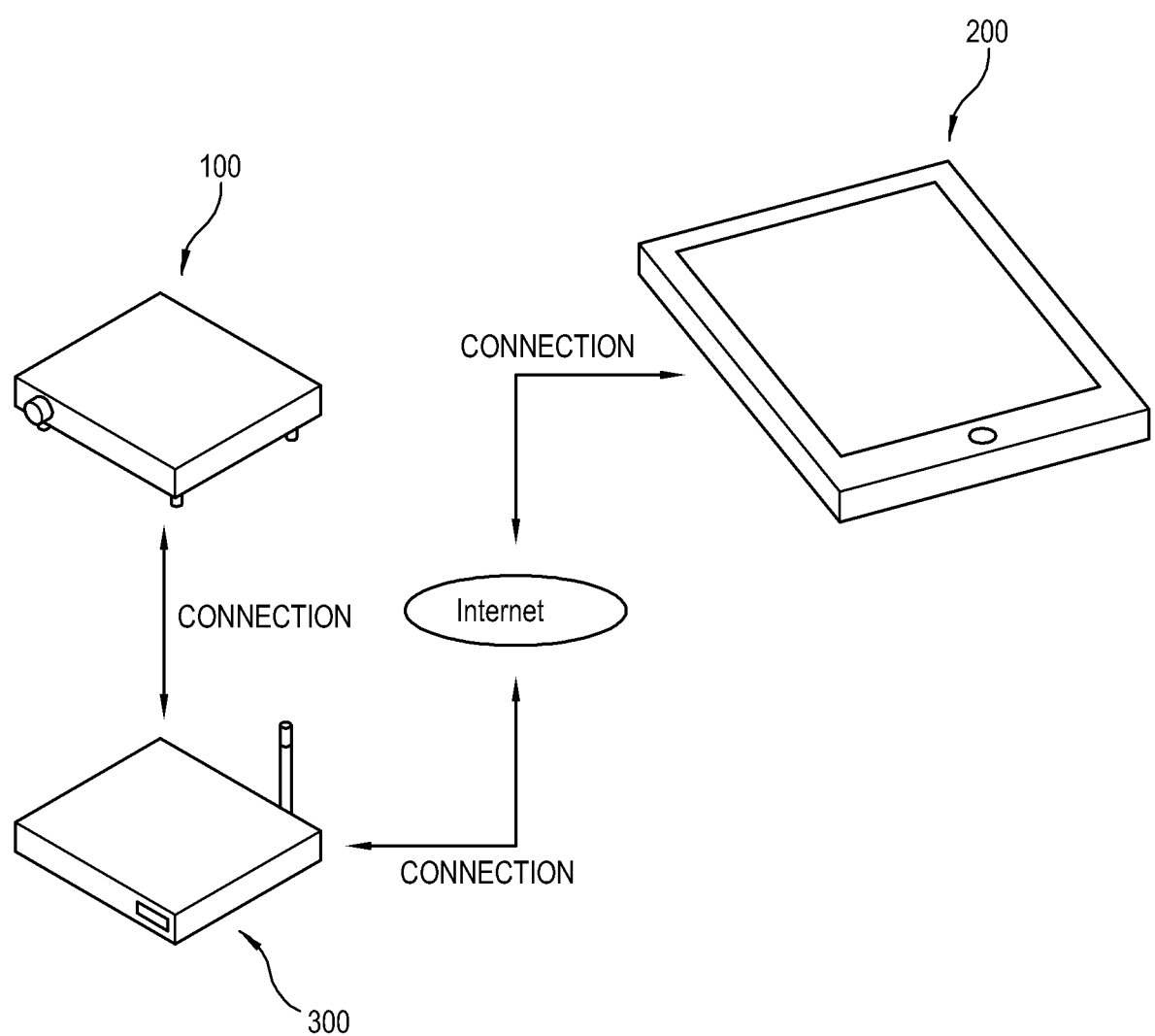
FIG. 2 illustrates that an image capturing apparatus and a display apparatus are connected through an access point (AP) in the system according to the first exemplary embodiment.

FIG. 2 illustrates that an image capturing apparatus 100 and a display apparatus 200 are connected through an access point (AP) 300 in the system according to the first exemplary embodiment.

As shown in FIG. 2, the system further includes the AP 300 having an access to a wide area communication network such as the Internet. The AP 300 may be for example connected to a router or gateway (not shown) by a wire, and thus have an access to the Internet. The AP 300 complies with IEEE 802.11 standards, and operates in an infrastructure mode of Wi-Fi.

The AP 300 performs wireless communication with general devices within a preset range, i.e. a hot-spot. To make a certain apparatus access the AP 300 and perform communication, the certain apparatus has to be within the hot spot of the AP 300. Therefore, a mobile apparatus to be used by a user while moving may be not suitable for communication using the AP 300.

The AP 300 communicates with the image capturing apparatus 100 placed within the hot spot, so that the image capturing apparatus 100 can communicate with the display apparatus 200 through the Internet. Although it is not shown, the display apparatus 200 may be connected to Internet directly or via a separate relay (not shown).

For example, image data transmitted from the image capturing apparatus 100 to the AP 300 is uploaded to a predetermined address of a server (not shown) through the Internet. The display apparatus 200 accesses the address of the server (not shown) and downloads the image data. Alternatively, the image data transmitted from the image capturing apparatus 100 to the AP 300 may be transmitted to the display apparatus 200 through the Internet without being stored in the server (not shown) or the like. Like this, there are many ways of establishing a communication path between the image capturing apparatus 100 and the display apparatus 200.

With this structure of the system, the image capturing apparatus 100 accesses the wide area network for communication through the AP 300. The image capturing apparatus 100 is assigned with an Internet protocol (IP) address from the AP 300 and interactively communicates with the wide area network. For the communication, the image capturing apparatus 100 may receive and store information such as Wi-Fi protected setup (WPS), wireless Internet service provider (WISP), service set identifier (SSID), etc. from the AP 300. WPS refers to information of specifying a position of the AP 300, WISP refers to information of specifying a service provider or business operator for the network/Internet, and SSID refers to identification data of the AP 300.

The IP address refers to an address for specifying a communication target, used in a local area network (LAN), a wide area network (WAN) and the Internet. The IP version 4 (IPv4) has been used as the IP address in these days but falls short. Accordingly, the IP version 6 (IPv6) longer than the IP version 4 is increasingly widespread. The IP address assigned to the image capturing apparatus 100 may be a static IP address, or a dynamic IP address using a dynamic host configuration protocol (DHCP).

Figure 3:
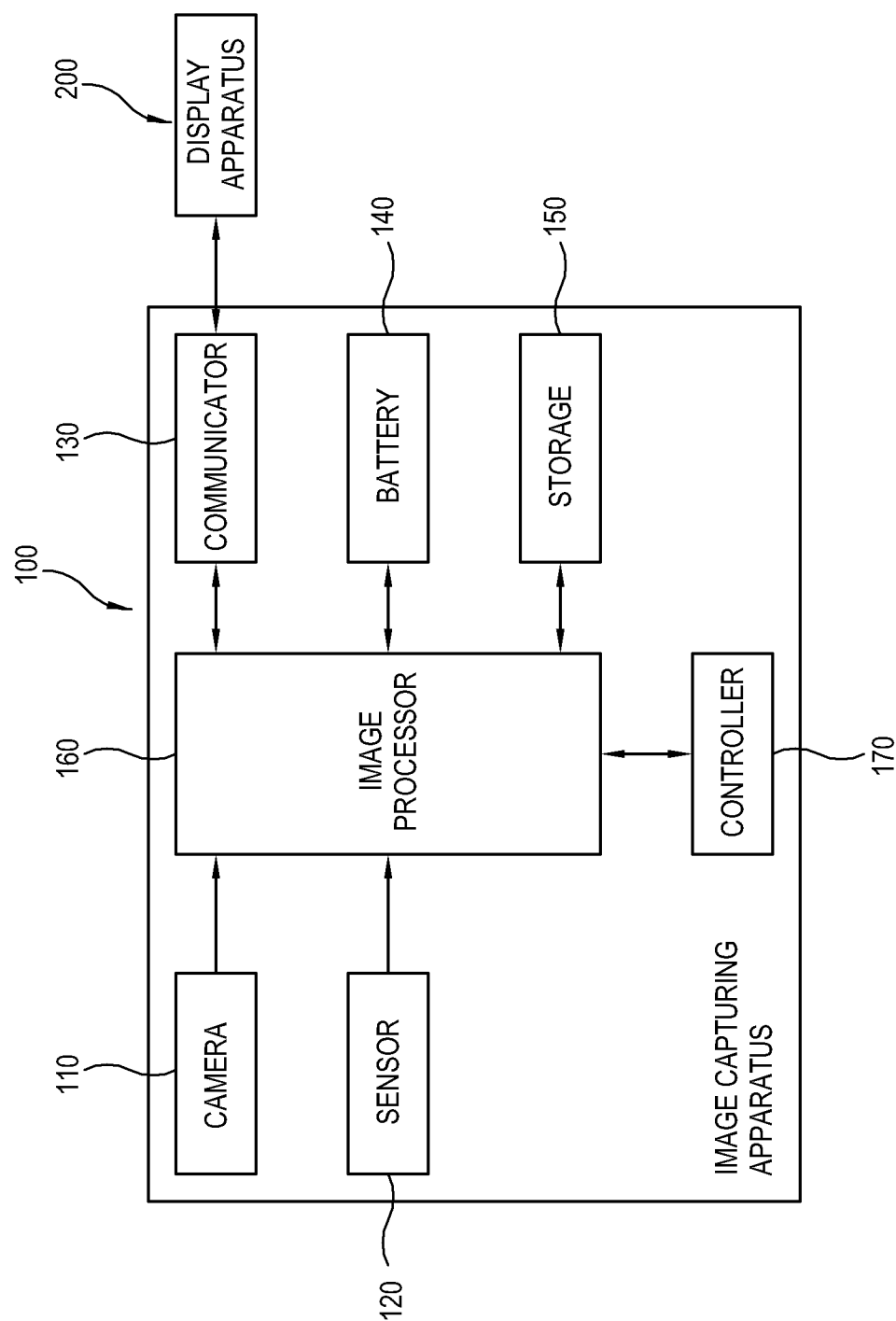
FIG. 3 is a block diagram of the image capturing apparatus according to the first exemplary embodiment.

FIG. 3 is a block diagram of the image capturing apparatus 100 according to the first exemplary embodiment.

As shown in FIG. 3, the image capturing apparatus 100 includes a camera 110 for photographing an object, a sensor 120 for sensing a motion of the object, a communicator 130 for wireless communication with the display apparatus 200, a battery 140 for supplying power to the image capturing apparatus 100, a storage 150 for storing data, an image processor 160 for generating photographed image data of the object photographed by the camera 110, and a controller 170 for controlling operations of the image processor 160. With these elements, the image capturing apparatus 100 does not need a cable for connection with the outside for the purpose of its operations.

In this exemplary embodiment, the image processor 160 and the controller 170 are separated from each other, but not limited thereto. Alternatively, the controller 170 may be embedded in the image processor 160.

The camera 110 generates the photographed image data by photographing an object and transmits it to the image processor 160. The data transmitted from the camera 110 to the image processor 160 may be raw data before being processed by a specific format, or data after being compressed by a specific format. There are no limits to the structure of the camera 110 as long as it can photograph an object. For example, the camera 110 may be achieved by various structures such as a complementary metal-oxide-semiconductor (CMOS) camera, a charge-coupled device (CCD) camera, or the like.

The sensor 120 senses presence of an object from the outside of the image capturing apparatus 100. If the image capturing apparatus 100 is used as the CCTV, the camera 110 may continuously photograph surrounding environments so that the image processor 160 can generate and output the photographed image data. However, this method may be inefficient in some cases. If it is designed to minimize consumption of battery power, the camera 110 may start operating only when there is a change in the external environment, for example, when the object makes a motion. The sensor 120 senses a new motion of a predetermined object in the surrounding environment and outputs a sense signal or an interruption signal.

The sensor 120 may employ various biometric sensors. For example, the sensor 120 includes a passive infrared ray (PIR) sensor. Besides, the sensor 120 may employ various sensors such as an active-type sensor, an ultrasonic sensor, a microwave sensor, etc. If many factors such as the power consumption, etc. are taken into account, the PIR sensor is relatively practical.

The PIR sensor monitors variation in infrared rays and senses presence of an object such as a human or the like.

When a human body gets within a sensing zone of the sensor, the amount of infrared rays entering the sensor is varied depending on difference in temperature between a human body surface and surroundings. Thus, the PIR sensor detects the variation in the infrared rays, thereby sensing a human body. The PIR sensor forms an electrode pattern where a pair of pyroelectric devices are complementarily connected to each other.

The communicator 130 serves as an interface through which the image capturing apparatus 100 can communicate with the outside such as the display apparatus 200, etc. The communicator 130 converts the data processed by the image processor 160 into a carrier signal according to a preset protocol and wirelessly transmits it to the display apparatus 200. Although the communicator 130 is not limited to the specific kind or type, the amount of data to be transmitted per unit time in the communicator 130 has to be greater than a preset value in order to wirelessly transmit the image data processed by the image processor 160. In this regard, the communicator 130 may be for example achieved by a Wi-Fi communication chip supporting the Wi-Fi protocol. Of course, the communicator 130 is not limited to the foregoing example, but may be designed to use various protocols and chipsets.

The battery 140 supplies power for operating the image capturing apparatus 100, i.e. activating various internal elements of the image capturing apparatus 100. The battery 140 may include a primary cell, a secondary cell, etc. The power supplied from the battery 140 to the respective elements may be selectively cut off. Specifically, the power supplied to a specific element is cut off under control of the controller 170, thereby inactivating the specific element.

Here, the inactivation may have many meanings in accordance with types of designing the apparatus. First, if a certain element is activated, it means that this element normally receives power and performs normal operations or is ready for performing the operations.

On the other hand, if a certain element is inactivated, it means that power supplied to this element is cut off, or this element is shut down not to consume power and is not ready for performing normal operations even though the power is supplied to this element.

That is, there are many meanings of whether an element is activated or inactivated. For example, if the element is consuming power, it means an activated status. On the other hand, if the element does not consume power, it means an inactivated status.

The storage 150 stores many pieces of data. The storage 150 may temporarily store the photographed image data to be processed by the image processor 160, or store various pieces of information needed for operating the image processor 160, the controller 170, etc. The storage 150 includes a nonvolatile memory, in which data is retained even though power is cut off, like a flash memory. Alternatively, the storage 150 may be achieved by combination of a nonvolatile memory and a volatile memory.

The image processor 160 converts raw data of the photographed image received from the camera 110 into data of a preset format and transmits it to the communicator 130. For example, the image processor 160 processes data of the photographed image received in real time from the camera 110, temporarily stores the processed data in the storage 150, and transmits the temporarily stored data to the communicator 130 if the data temporarily stored in the storage 150 reaches a predetermined amount of data.

As described above, if the camera 110 is continuously activated to photograph surrounding environments, it may be not suitable for various issues such as the consumption of the battery power. Thus, the camera 110 does not operate in an initial status and starts operating when the sensor 120 senses a motion of an object.

Below, operations of the image capturing apparatus 100 will be described.

Figure 4:
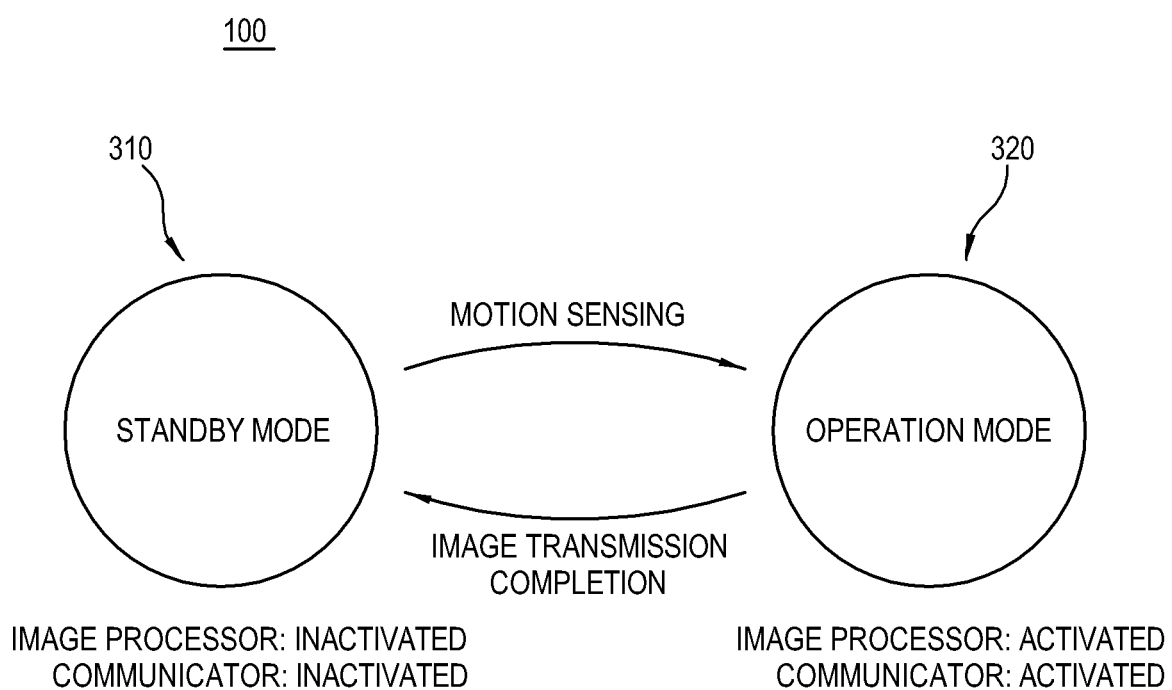
FIG. 4 illustrates switching of an operation mode in the image capturing apparatus according to the first exemplary embodiment.

FIG. 4 illustrates switching of an operation mode in the image capturing apparatus 100 according to the first exemplary embodiment.

As shown in FIG. 4, the image capturing apparatus 100 may alternate between the standby mode 310 and the operation mode 320. For example, the image capturing apparatus 100 is in the standby mode 310 at an initial status, and enters the operation mode 320 to photograph an object when the sensor senses a motion of the object.

In the standby mode (or sleep mode) 310, at least some of elements in the image capturing apparatus 100 are inactivated so as to minimize the consumption of the battery power. The foregoing elements of the image capturing apparatus 100 are different in power consumption when they are in the activated status. The elements consuming the most power in the activated status are the image processor and the communicator. Therefore, at least the image processor and the communicator are inactivated in the standby mode 310, thereby reducing power to be consumed by them. Of course, the camera, the storage and the like elements may be also inactivated in the standby mode 310.

Even during the standby mode 310, the sensor is in at least the activated status. This is because the sensor is needed for sensing a motion of an object. Whether to activate the controller may be varied depending on the design of the image capturing apparatus 100. If the controller is designed to activate the image processor in response to a sense signal from the sensor, the controller is in the activated status even during the standby mode 310.

On the other hand, if the controller is embedded in the image processor, the image processor may be designed to be automatically activated in response to a sense signal from the sensor. That is, the image processor may be activated when the sense signal from the sensor is input to a preset input terminal of the image processor.

If the sensor senses a motion of an object during the standby mode 310, the sensor outputs a sense signal or an interruption signal. Since the image capturing apparatus 100 enters the operation mode 320 in response to the sense signal, all the elements such as the image processor and the communicator of the image capturing apparatus 100 are activated to operate normally in the operation mode 320.

During the operation mode 320, the camera photographs an object and transmits image data obtained by photographing the object to the image processor, and the image processor processes the image data and transmits it to the display apparatus through the communicator. In the operation mode 320, the operation of the camera for photographing an object, the operation of the image processor for processing the image data, and the operation of the communicator for transmitting the image data are performed in real time.

If the operation of the communicator for transmitting the image data is completed, the image capturing apparatus 100 returns to the standby mode 310. Therefore, the image processor and the communicator are inactivated again and kept inactivated until the sensor senses a motion of an object.

As described above, both the image processor and the communicator in this exemplary embodiment are simultaneously driven to process and transmit the image data in real time, and therefore the image processor and the communicator are operated for a relatively long time in the operation mode 320 even though they have the standby mode 310. The elements consuming the most power in the image capturing apparatus 100 are the image processor for processing the image data and the communicator for transmitting the image data. Therefore, the longer the time of activating the image processor and the communicator, the more the consumption of the battery power.

Basically, there are many communication modules for wireless communication. However, the data transmission speed or the amount of data to be transmitted per unit time in the communication module has to be greater than a preset level in order to transmit not a simple text or information but image data having a preset resolution or higher. A communication module of satisfying such a condition is likely to consume more power than the other communication modules.

In this regard, there is a need of reducing the time of operating the elements consuming relatively much power like the image processor and the communicator, in order to minimize the consumption of the battery power in the image capturing apparatus 100 and prolong a power supplying time of the battery. Below, a related exemplary embodiment will be described.

Figure 5:
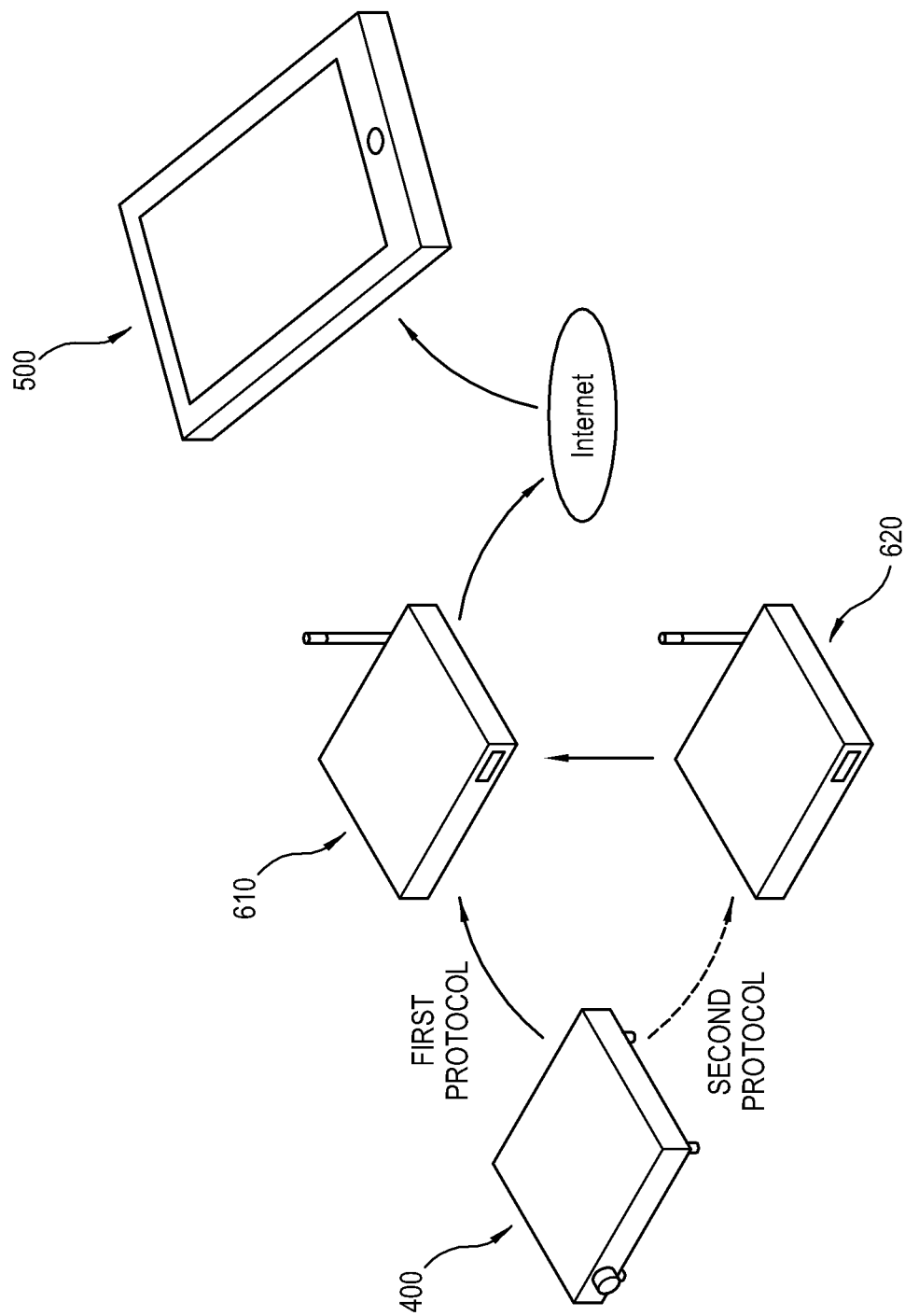
FIG. 5 illustrates a system according to a second exemplary embodiment system.

FIG. 5 illustrates a system according to a second exemplary embodiment system.

As shown in FIG. 5, the system according to the second exemplary embodiment includes an image capturing apparatus 400 for capturing an object and generating image data, and a display apparatus 500 for displaying an image based on the image data output from the image capturing apparatus 400. Further, the system includes an AP 610 having an access to the Internet, and a communication hub 620 connected to the AP 610. In this exemplary embodiment, it will be assumed that the image capturing apparatus 400 and the display apparatus 500 are far away from each other, and communicate with each other through the Internet or the like wide area network.

In this system, two types of communication networks can be established between the image capturing apparatus 400 and the display apparatus 500. One is that the image capturing apparatus 400 accesses the AP 610 in accordance with a preset first wireless communication protocol and communicates with the display apparatus 500 through the AP 610. The other one is that the image capturing apparatus 400 accesses the communication hub 620 in accordance with a preset second wireless communication protocol and communicates with the display apparatus 500 through the AP 610 by accessing the AP 610 via the communication hub 620.

The communication hub 620 is configured to not only communicate with the image capturing apparatus 400 according to the second wireless communication protocol, but also communicate with the AP 610 according to the first wireless communication protocol. That is, the image capturing apparatus 400 may directly communicate with the AP 610 according to the first wireless communication protocol, and may also communicate with the AP 610 via the communication hub 620 according to the second wireless communication protocol. In such a communication system, the image capturing apparatus 400 can communicate with the display apparatus 500 according to either of the first wireless communication protocol or the second wireless communication protocol.

Below, elements of the image capturing apparatus 400 in this exemplary embodiment will be described.

Figure 6:
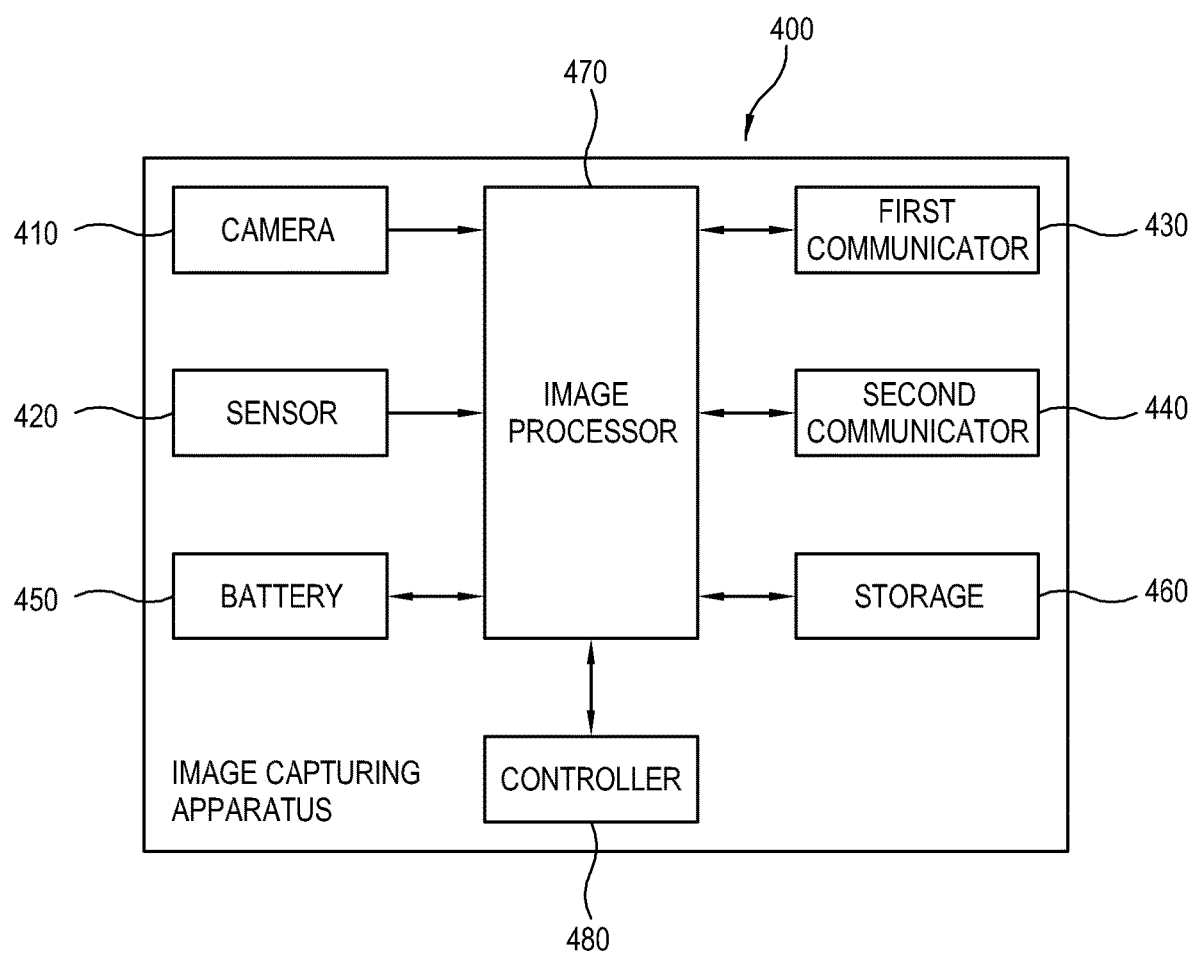
FIG. 6 is a block diagram of an image capturing apparatus according to the second exemplary embodiment.

FIG. 6 is a block diagram of the image capturing apparatus 400 according to the second exemplary embodiment.

As shown in FIG. 6, the image capturing apparatus 400 according to the second exemplary embodiment includes a camera 410, a sensor 420, a first communicator 430, a second communicator 440, a battery 450, a storage 460, an image processor 470 and a controller 480. The camera 410, the sensor 420, the battery 450, the storage 460 and the image processor 470 in the second exemplary embodiment are substantially equivalent to those described with reference to FIG. 3, and thus repetitive descriptions thereof will be avoided as necessary.

The image capturing apparatus 400 in this embodiment includes two kinds of wireless communication modules, i.e. the first communicator 430 and the second communicator 440 for the wireless communication. Here, the first communicator 430 and the second communicator 440 support different the wireless communication protocols, respectively. Further, the first communicator 430 and the second communicator 440 in this embodiment are respectively used for different purposes.

The first wireless communication protocol supported by the first communicator 430 and the second wireless communication protocol supported by the second communicator 440 may be selected among various wireless communication protocols. Here, the amount of data to be transmitted per unit time according to the first wireless communication protocol has to be more than that according to the second wireless communication protocol. Thus, the first communicator 430 consumes more power than the second communicator 440. Like this, the first communicator 430 and the second communicator 440 are used for different purposes, details of which will be described later.

The first wireless communication protocol may be for example Wi-Fi. In this case, the basic function of the first communicator 430 is similar to that of the foregoing communicator 130 of FIG. 3. On the other hand, the second wireless communication protocol may be for example Zigbee. In this case, the second communicator 440 is achieved by a Zigbee communication module.

Below, Zigbee communication will be described.

Zigbee is a low-power wireless communication method based on IEEE 802.15 to establish a personal communication network. Zigbee uses a wireless mesh network (WMN) to transmit data to a target via many intermediate nodes, and supports communication a wide range even at low power.

Zigbee is used in a field of requiring a long lasting battery and security with a low transmission speed. Zigbee has a transmission speed of 250 kbit per second and provides security of using a symmetric-key encryption of 128 bit.

Of course, the second communicator 440 may use the wireless communication protocols other than Zigbee as long as it consumes low power and has a low transmission speed as compared with the first communicator 430.

With this structure, the controller 480 makes the image capturing apparatus 400 enter one among the plurality of preset modes in response to a preset event, so that the power of the battery 450 can be consumed as low as possible. Thus, the battery 450 lasts for as long as possible, in which detailed operations of the controller 480 will be described later.

Below, it will be described that the image capturing apparatus 400 is paired with each of the hub for performing the Zigbee communication and the AP for performing the Wi-Fi communication.

Figure 7:
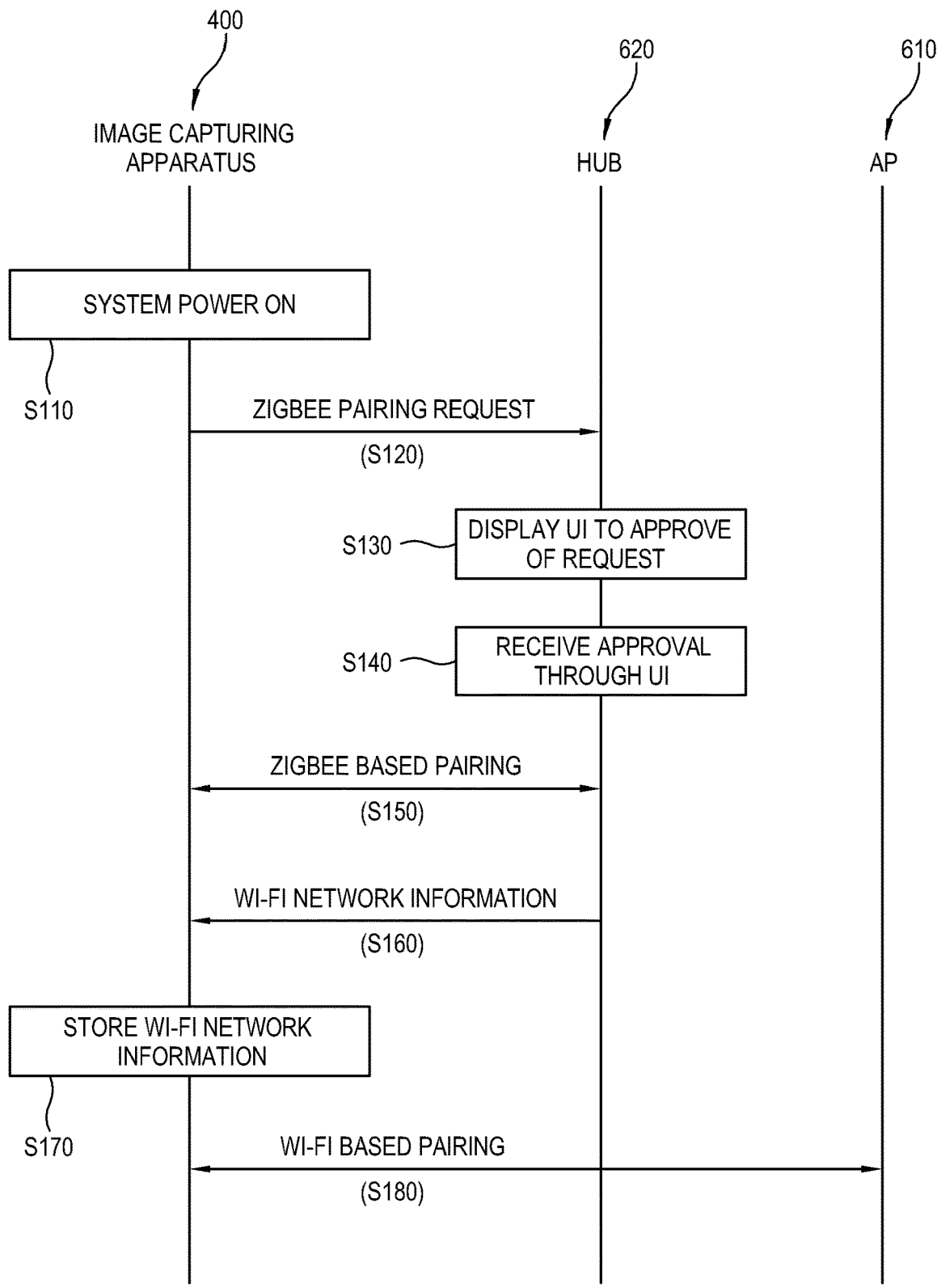
FIG. 7 is a flowchart showing a process where the image capturing apparatus according to the second exemplary embodiment is paired with a hub and an AP.

FIG. 7 is a flowchart showing a process where the image capturing apparatus 400 according to the second exemplary embodiment is paired with a hub 620 and an AP 610.

As shown in FIG. 7, the image capturing apparatus 400 establishes paths for communication with the hub 620 and the AP 610 by performing the following processes when the system is initially powered on. This process is to make the image capturing apparatus 400 store relevant network information in order to establish such a communication path. Therefore, the image capturing apparatus 400 communicates with the hub 620 or the AP 610 based on the previously stored network information without repeating the foregoing pairing process again in the future.

At operation S110 the system with the image capturing apparatus 400 is initially turned on. During this operation, the image capturing apparatus 400 activates the first communicator of supporting the Wi-Fi communication protocols and the second communicator of supporting the Zigbee communication protocol.

At operation S120 the image capturing apparatus 400 transmits a Zigbee pairing request to the hub 620 through the first communicator.

At operation S130 the hub 620 displays a user interface (UI) for allowing a user to select whether to accept the Zigbee pairing request. Here, if the hub 620 has its own display panel, the UI is displayed on the display panel. On the other hand, if the hub 620 does not have the display panel, the UI is displayed on a TV or the like external device connected to and communicating with the hub 620.

At operation S140 the hub 620 determines whether or not a user approves of the acceptance through the UI. If a user does not approve of the acceptance through the UI, the hub 620 discontinues the operation.

On the other hand, if a user approves of the acceptance through the UI, at operation S150 the hub 620 performs Zigbee-based pairing with the image capturing apparatus 400.

In the state that a path for the Zigbee communication is established between the hub 620 and the image capturing apparatus 400, at operation S160 the hub 620 transmits Wi-Fi network information for communication with the AP 610 to the image capturing apparatus 400. The Wi-Fi network information refers to information needed for the image capturing apparatus 400 to do Wi-Fi based communication with the AP 610, and for example includes SSID and password information of the AP 610. This information is previously stored in the hub 620 since the hub 620 is connected to and capable of communicating with the AP 610.

At operation S170 the image capturing apparatus 400 stores information received from the hub 620. At operation S180 the image capturing apparatus 400 accesses the AP 610 based on the stored information, and is paired with the AP 610 based on the Wi-Fi communication.

With this process, the image capturing apparatus 400 is paired with and communicates with each of the hub 620 and the AP 610d.

Below, it will be described that the image capturing apparatus 400 alternates between a plurality of preset modes in response to a specific event.

FIG. 8 illustrates a plurality of modes for the image capturing apparatus according to the second exemplary embodiment, and activated statuses of the elements in the image capturing apparatus according to the modes.

As shown in FIG. 8, the image capturing apparatus may operate in one of a standby mode, the notification mode, an image capture mode and an image streaming mode, and be switched over between the modes in in response to a preset event.

The elements of the image capturing apparatus include the camera, the sensor, the battery, the first communicator, the second communicator, the storage, the image processor and the controller as described above. Among them, three elements, i.e. the first communicator, the second communicator and the image processor are related to an issue of power consumption. Basically, the sensor and the controller are activated in all the modes, and the camera is not significantly related to the issue of the power consumption. Therefore, FIG. 8 shows the activated statuses of only the first communicator, the second communicator and the image processor according to the modes.

In the standby mode, the consumption of the battery power is minimized. In an initial status, the image capturing apparatus operates in the standby mode. In the standby mode, the first communicator, the second communicator and the image processor are all inactivated.

In the notification mode, the image capturing apparatus asks a user of the external device about whether to photograph an object through the camera. Here, the external apparatus is provided as the display apparatus. In the notification mode, the image capturing apparatus generates a photographed image by photographing an object and asks the display apparatus about an approval instruction to transmit the photographed image to the display apparatus. In response to the asking from the image capturing apparatus, the display apparatus may display a UI for allowing a user to select whether to give approval, or may be automatically approved in accordance with previous settings of the display apparatus without a user's selection.

In the notification mode, the second communicator is activated, but the first communicator and the image processor are inactivated. The reason why only the second communicator is activated in the notification mode is because the image capturing apparatus has to transmit the approval instruction to the display apparatus through the second communicator.

Here, the image capturing apparatus uses not the first communicator but the second communicator to transmit the approval instruction for the following reason.

As described above, the first communicator consumes more power than the second communicator since it transmits a larger amount of data per unit time than the second communicator. Therefore, the first communicator is used in transmitting a relatively large amount of data such as the image data. However, the amount of data for the approval instruction is less than that of the image data, and it is thus wasteful if the first communicator consuming relatively much power is used in transmitting the approval instruction.

Therefore, in the notification mode, the image capturing apparatus activates the second communicator consuming relatively less power to transmit the approval instruction and receive a response to the approval instruction without activating the first communicator. Thus, it is possible to reduce the consumption of the battery power.

The second communicator may be also kept activated in the image capture mode and the image streaming mode so as to exchange control information between the display apparatus and the image capturing apparatus. Alternatively, if it is designed to prevent the control information from being transmitted and received during the image capture mode or the image streaming mode, the second communicator may be inactivated in the image capture mode and the image streaming mode.

In the image capture mode, the camera photographs an object, and the image processor processes data of a photographed image. Therefore, the image processor has to be activated during the image capture mode. On the contrary to the first exemplary embodiment, the first communicator is kept inactivated during the image capture mode since the data of the photographed image is not transmitted from the image capturing apparatus to the display apparatus in real time during the image capture mode.

The data of the photographed image generated during the image capture mode is stored in the storage of the image capturing apparatus.

In the image streaming mode, the previously stored data of the photographed image is transmitted from the image capturing apparatus to the display apparatus. The previously stored data of the photographed image is image data obtained by the camera during the image capture mode. In the image streaming mode, the image processor is activated to acquire and process the data of the photographed image from the storage, and the first communicator is activated to transmit the data of the photographed image to the display apparatus.

Like this, the elements of the image capturing apparatus are different in their activated statuses according to the modes of the image capturing apparatus. The image capturing apparatus switches over between the modes in response to many preset events, and thus further reduces the consumption of the battery power as compared with that of the first exemplary embodiment where the modes are simply divided into the standby mode and the operation mode.

In particular, the operation mode of the first exemplary embodiment is subdivided into the notification mode, the image capture mode and the image streaming mode according to the second exemplary embodiment. For the notification mode, the second communicator that consumes less power than the first communicator is used, and it is thus possible to receive the approval instruction to photograph an object from the external display apparatus without activating the first communicator. Further, the subdivision into the image capture mode and the image streaming mode relatively decreases the time during which the first communicator is activated, thereby reducing the power consumed by the first communicator.

According to the first exemplary embodiment, during the operation mode, both the image processor and the communicator are activated, and the image data processed by the image processor is transmitted through the communicator in real time. By the way, the time during which the image processor generates the data of the photographed image based on the operation of the camera is much longer than the time during which the communicator transmits the generated data of the photographed image to the display apparatus.

In this exemplary embodiment, the data of the photographed image is generated and stored by the image processor and the first communicator is inactivated during the image capture mode, and the first communicator is activated to transmit the previously stored data of the photographed image during the image streaming mode. That is, the first communicator is activated in only the image streaming mode. Since the time taken in transmitting the data of the photographed image is shorter than the time taken in generating the data of the photographed image, it is possible to reduce the consumption of the battery power by minimizing the time during which the first communicator is activated.

Below, events for switching over between the modes will be described.

Figure 9:
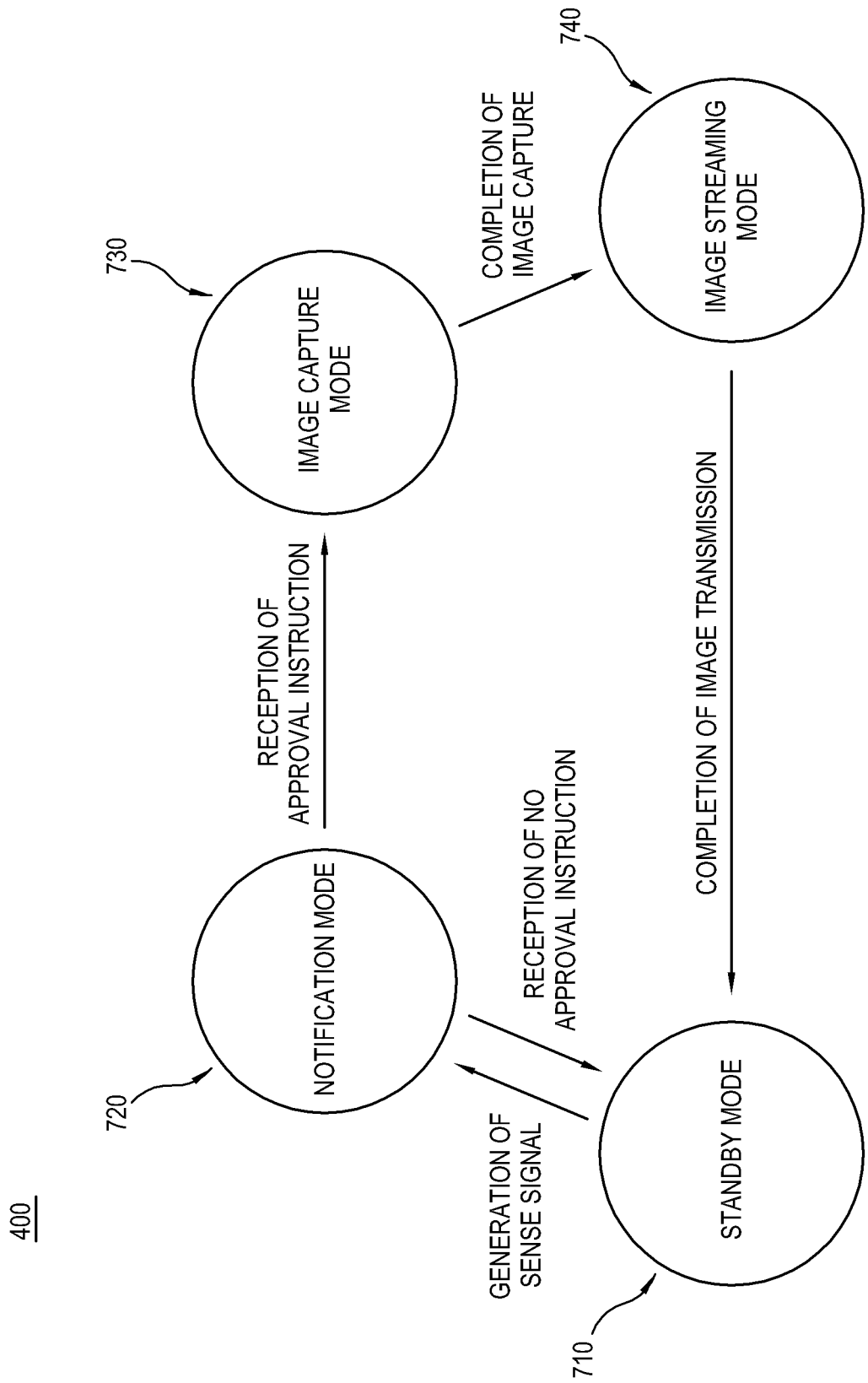
FIG. 9 illustrates the modes that the image capturing apparatus according to the second exemplary embodiment enters in response to specific events, respectively.

FIG. 9 illustrates the modes that the image capturing apparatus 400 according to the second exemplary embodiment enters in response to specific events, respectively.

As shown in FIG. 9, the image capturing apparatus 400 is configured to switch over between a standby mode 710, a notification mode 720, an image capture mode 730 and an image streaming mode 740 in accordance with preset events. In an initial status, the image capturing apparatus 400 operates in the standby mode 710 where the least power is consumed.

If the sensor senses a motion of an object and generates a sense signal during the standby mode 710, the image capturing apparatus 400 enters the notification mode 720.

In the notification mode 720, the image capturing apparatus 400 makes a request for approval to photograph an object to an external display apparatus. If the image capturing apparatus 400 does not receive an approval instruction from the display apparatus within a preset period of time or receives a disapproval instruction, the image capturing apparatus 400 switches over from the notification mode 720 to the standby mode 710.

On the other hand, in the notification mode 720, if the image capturing apparatus 400 receives the approval instruction from the display apparatus, the image capturing apparatus 400 switches over from the notification mode 720 to the image capture mode 730. During the image capture mode 730 the image capturing apparatus 400 photographs an object through the camera and generates and stores the photographed image data.

In the image capture mode 730, if an image is captured for a preset period of time, i.e. if the photographed image data corresponding to an object photographed for a preset period of time is generated and stored, the image capturing apparatus 400 switches over from the image capture mode 730 to the image streaming mode 740. During the image streaming mode 740, the image capturing apparatus 400 transmits the photographed image data stored in the image capture mode 730 to the display apparatus.

If the transmission of the photographed image data is completed, the image capturing apparatus 400 switches over from the image streaming mode 740 to the standby mode 710.

In response to various events as described above, the image capturing apparatus 400 switches over between the modes and performs the operations designated according to the modes.

Below, a process of controlling the image capturing apparatus 400 according to an exemplary embodiment will be described.

Figure 10:
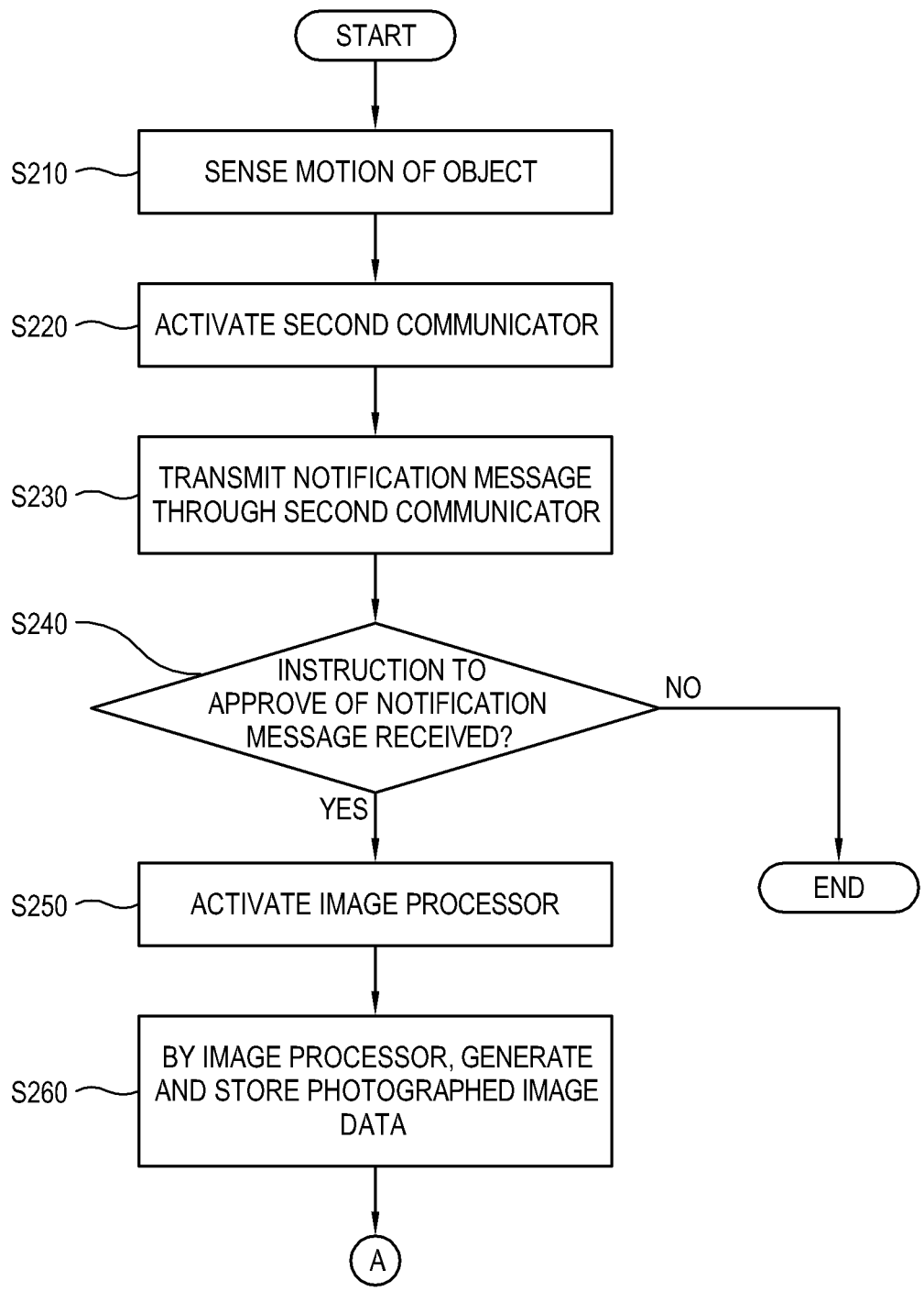
FIG. 10 and FIG. 11 are a flowchart of controlling the image capturing apparatus according to the second exemplary embodiment.
Figure 11:
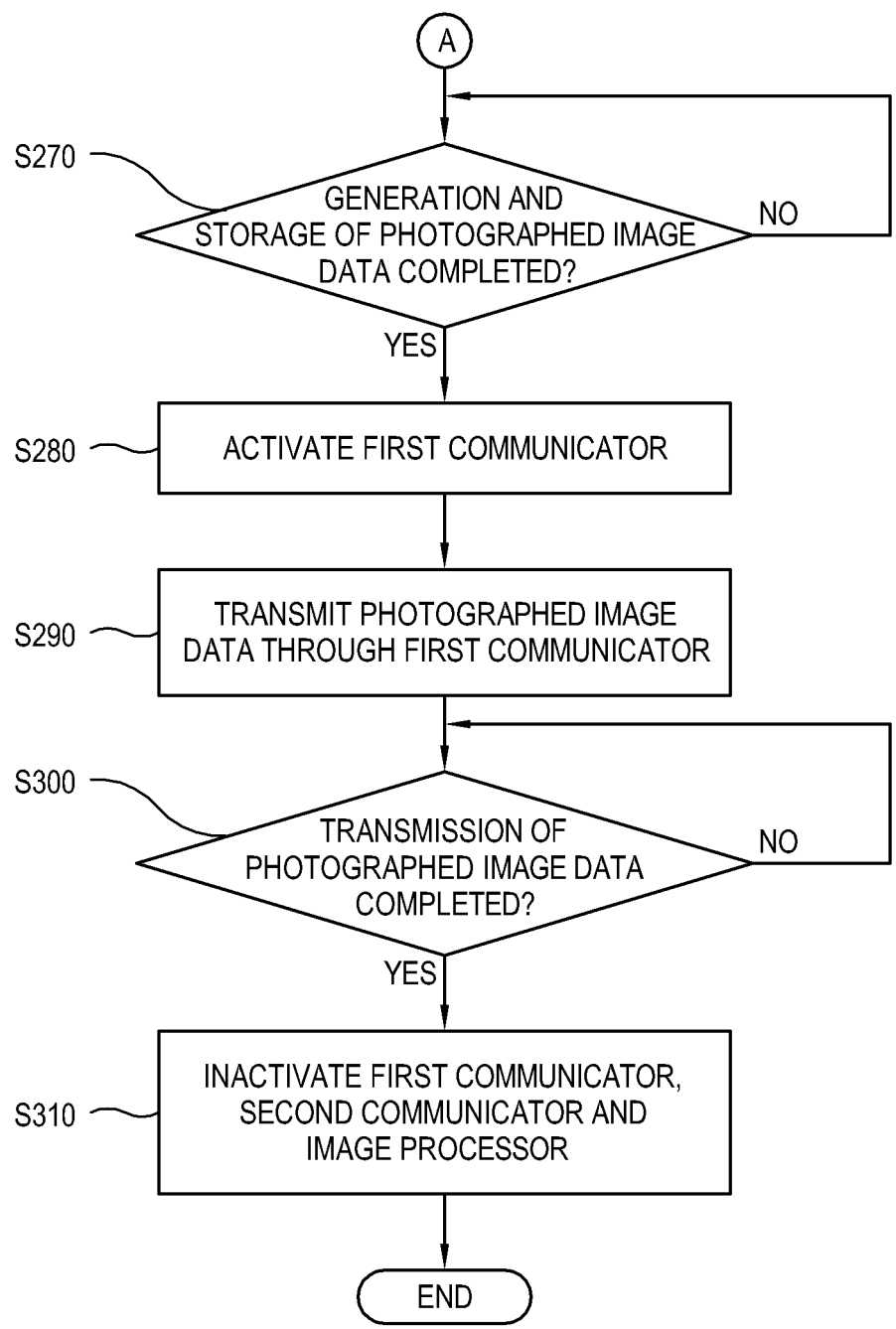

FIG. 10 and FIG. 11 are a flowchart of controlling the image capturing apparatus according to the second exemplary embodiment.

As shown in FIG. 10, at operation S210 the sensor senses a motion of an object while the image capturing apparatus is in the standby mode.

At operation S220 the image capturing apparatus switches over to the notification mode and activates the second communicator. In this exemplary embodiment the second communicator performs communication based on the Zigbee protocol.

At operation S230 the image capturing apparatus transmits a notification message to the display apparatus through the second communicator. The notification message includes a request for approval of whether the image capturing apparatus photographs an object and transmits the photographed image data to the display apparatus.

At operation S240 the image capturing apparatus determines whether the second communicator receives an approval instruction to the notification message from the display apparatus within a preset period of time. If the second communicator does not receive the approval instruction from the display apparatus or receives a disapproval instruction from the display apparatus, the image capturing apparatus stops this process.

On the other hand, if the second communicator receives the approval instruction from the display apparatus within a preset period of time, at operation S250 the image capturing apparatus switches over to the image capture mode and activates the image processor.

At operation S260 the image capturing apparatus photographs the object through the camera, generates the photographed image data by the image processor, and stores the photographed image data in the storage.

As shown in FIG. 11, at operation S270 the image capturing apparatus determines whether the generation and storage of the photographed image data are completed. If the generation and storage of the photographed image data are not completed, monitoring is continued until the generation and storage are completed.

When the generation and storage of the photographed image data are completed, at operation S280 the image capturing apparatus switches over to the image streaming mode and activates the first communicator. In this exemplary embodiment, the first communicator performs communication based on the Wi-Fi protocol.

At operation S290 the image capturing apparatus transmits the stored photographed image data to the display apparatus through the first communicator.

At operation S300 the image capturing apparatus determines whether the transmission of the photographed image data is completed. If the transmission of the photographed image data is not completed, monitoring is continued until the transmission is completed.

When the transmission of the photographed image data is completed, at operation S310 the image capturing apparatus switches over to the standby mode and inactivates the first communicator, the second communicator and the image processor.

With this operations, the image capturing apparatus minimizes the consumption of the battery power and relatively prolongs the lasting time of the battery even while photographing the object and transmitting the data of the photographed image to the display apparatus.

Below, a process of controlling the display apparatus to receive the photographed image data from the image capturing apparatus will be described later.

Figure 12:
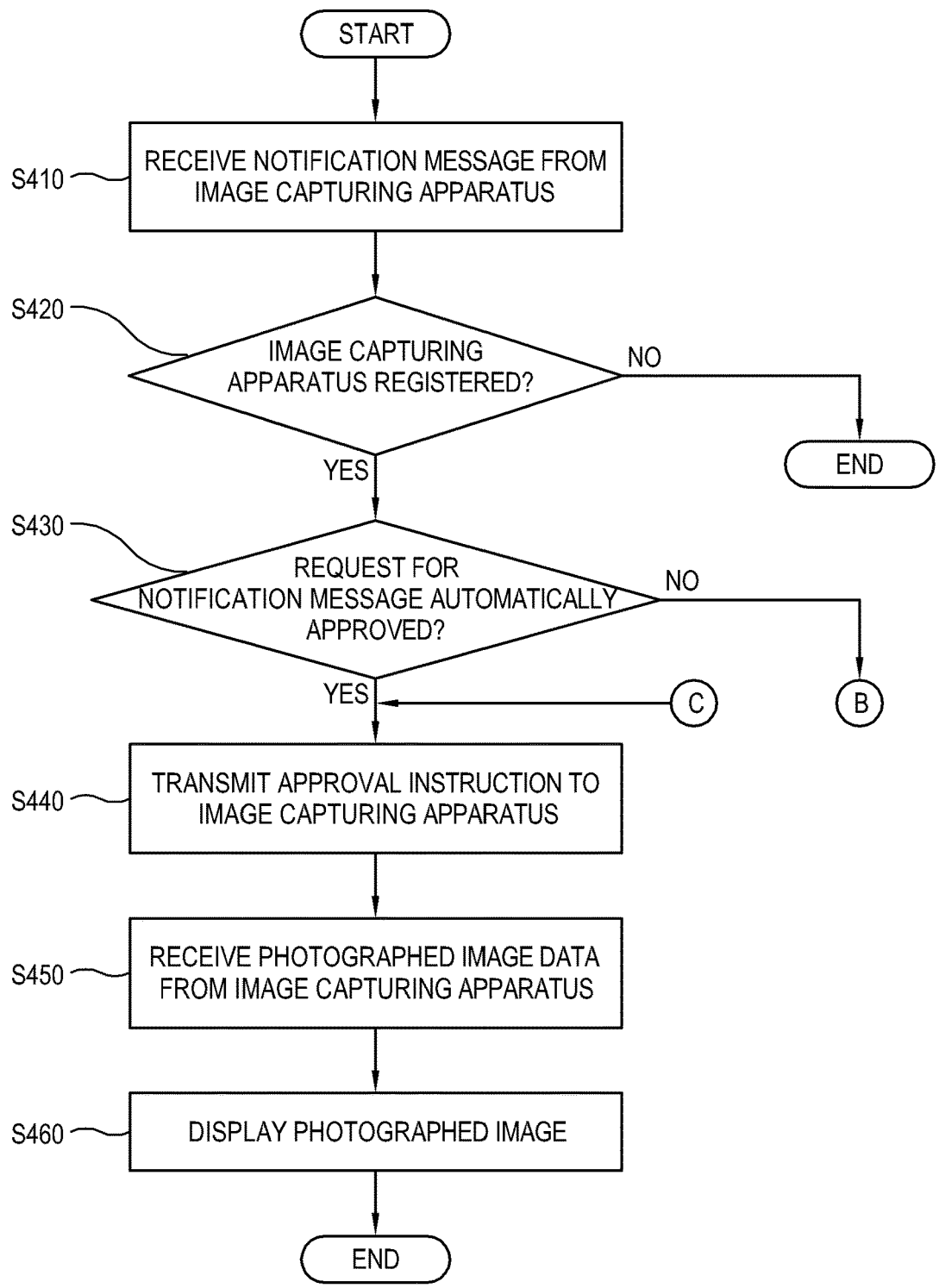
FIG. 12 and FIG. 13 are a flowchart of controlling a display apparatus according to the second exemplary embodiment.
Figure 13:
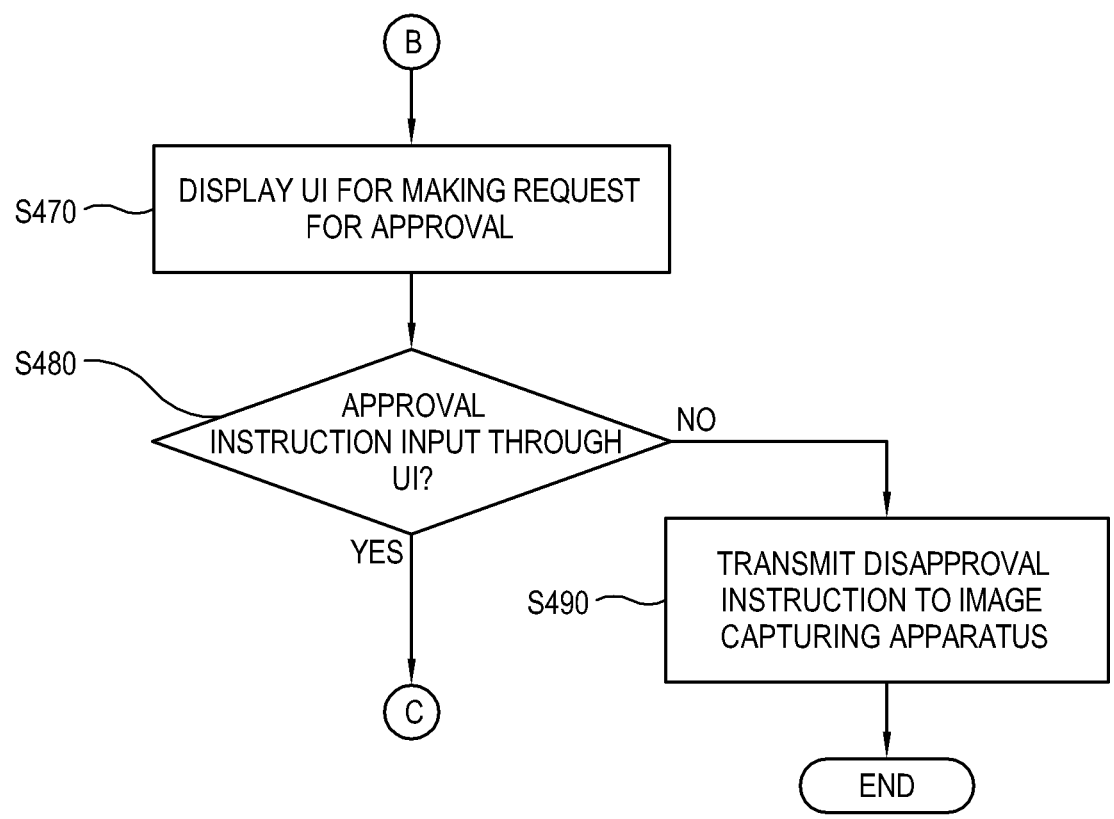

FIG. 12 and FIG. 13 are a flowchart of controlling a display apparatus according to the second exemplary embodiment.

As shown in FIG. 12, at operation S410 the display apparatus receives a notification message from the image capturing apparatus.

At operation S420 the display apparatus determines whether the image capturing apparatus of sending the notification message is registered in the display apparatus. Here, if the image capturing apparatus is not registered to the display apparatus, the display apparatus displays a UI for informing that the unregistered image capturing apparatus sends the notification message or guiding the image capturing apparatus to be registered. Further, the display apparatus may not perform any operation in response to the notification message sent from the unregistered image capturing apparatus.

If it is determined that the image capturing apparatus is registered in the display apparatus, at operation S430 the display apparatus determines whether to automatically approve of the request in the notification message. Such determination of automatic approval will be described later.

If it is determined that the request in the notification message is automatically approved, at operation S440 the display apparatus sends the image capturing apparatus the approval instruction to the notification message.

At operation S450 the display apparatus receives the photographed image data from the image capturing apparatus, and at operation S460 the display apparatus processes the photographed image data to be displayed as a photographed image.

On the other hand, if it is determined at operation S430 that the request in the notification message is not automatically approved, the display apparatus moves to operation S470 of FIG. 13.

As shown in FIG. 13, at operation S470 the display apparatus displays a UI for allowing a user to select whether to approve of the request.

At operation S480 the display apparatus determines whether a user inputs an approval instruction through the UI. If the approval instruction is input through the UI, the display apparatus moves to the operation S440.

On the other hand, if the approval instruction is not input through the UI within a preset period of time or a disapproval instruction is input through the UI, at operation S490 the display apparatus transmits the disapproval instruction in response to the notification message from the image capturing apparatus.

Below, examples of power consumption according to the modes of the image capturing apparatus will be described.

FIG. 14 is a table showing current consumption according to the modes in the image capturing apparatus according to the second exemplary embodiment.

As shown in FIG. 14, the image capturing apparatus may operate in one among the standby mode, the notification mode, the image capture mode and the image streaming mode. In the table of FIG. 14, 'Status' includes an activated or inactivated activated status, in which 'S' indicates the inactivated status, and 'A' indicates the activated status. Further, 'Current' refers to a current value, and 'Voltage' refers to a voltage level. In this exemplary embodiment, electric currents consumed according to the modes will be compared under the condition that the same voltage level is applied to the first communicator, the second communicator and the image processor. This embodiment is to compare the amounts of electric current consumed according to the modes, in which descriptions of detailed data about experimental environments will be omitted.

As described above, the second communicator has the inactivated status only in the standby mode, but has the activated status in the notification mode, the image capture mode and the image streaming mode. The image processor has the inactivated status in the standby mode and the notification mode, but has the activated status in the image capture mode and the image streaming mode. The first communicator has the activated status only in the image streaming mode, but has the inactivated status in the standby mode, the notification mode and the image capture mode.

In the standby mode, the second communicator, the image processor and the first communicator are all inactivated and thus consume only the standby power of very low level. Specifically, a total amount of electric current consumed in such three elements is relatively very low, e.g. 0.01 mA.

In the notification mode, the image processor and the first communicator are inactivated but the second communicator is activated to consume an electric current of 31.5 mA. The total amount of electric current consumed in the notification mode is still very low, e.g. 34.37 mA.

By the way, in the image capture mode, the first communicator is inactivated, but the image processor and the second communicator are activated. The image processor consumes an electric current of 150 mA, and the first second communicator consumes an electric current of 8.5 mA. The reason why the amount of electric current consumed by the first second communicator in the notification mode is greater than that in the image capture mode is because the first second communicator is used in transmitting the notification message and receiving the response to the notification message in the notification mode.

A total amount of electric current consumed in the image capture mode is 159.27 mA, which is greater than that in the notification mode.

In the image streaming mode, the second communicator, the image processor and the first communicator are all activated, in which the second communicator consumes an electric current of 8.5 mA, the image processor consumes an electric current of 150 mA and the first communicator consumes an electric current of 300 mA. There are no substantial differences in the amount of electric current consumed by the image processor between the image capture mode and the image streaming mode. However, it will be understood that a very large amount of electric current is consumed by the first communicator for transmitting the photographed image data.

A total amount of electric current consumed in the image streaming mode is 459.27 mA, which is about three times greater than that in the image capture mode. That is, the first communicator consumes the most electric current in the image capturing apparatus, and therefore the best way to reduce consumption of battery power is to decrease the activated status of the first communicator if possible.

In this regard, according to this exemplary embodiment, the operation of generating the photographed image data and the operation of transmitting the photographed image data are not performed at the same time. In other words, the first communicator is activated to transmit the photographed image data at a point of time when the generation of the photographed image data is completed, thereby minimizing the electric current consumed by the first communicator.

By the way, the display apparatus may have many ways of determining whether to automatically approve of the request in the notification message in the foregoing operation S430 of FIG. 12. One method is that the display apparatus or a user who uses the display apparatus determines whether the display apparatus is currently placed within an installation zone of the image capturing apparatus, and another method is that flag information for determining automatic approval is previously stored in the display apparatus.

Figure 15:
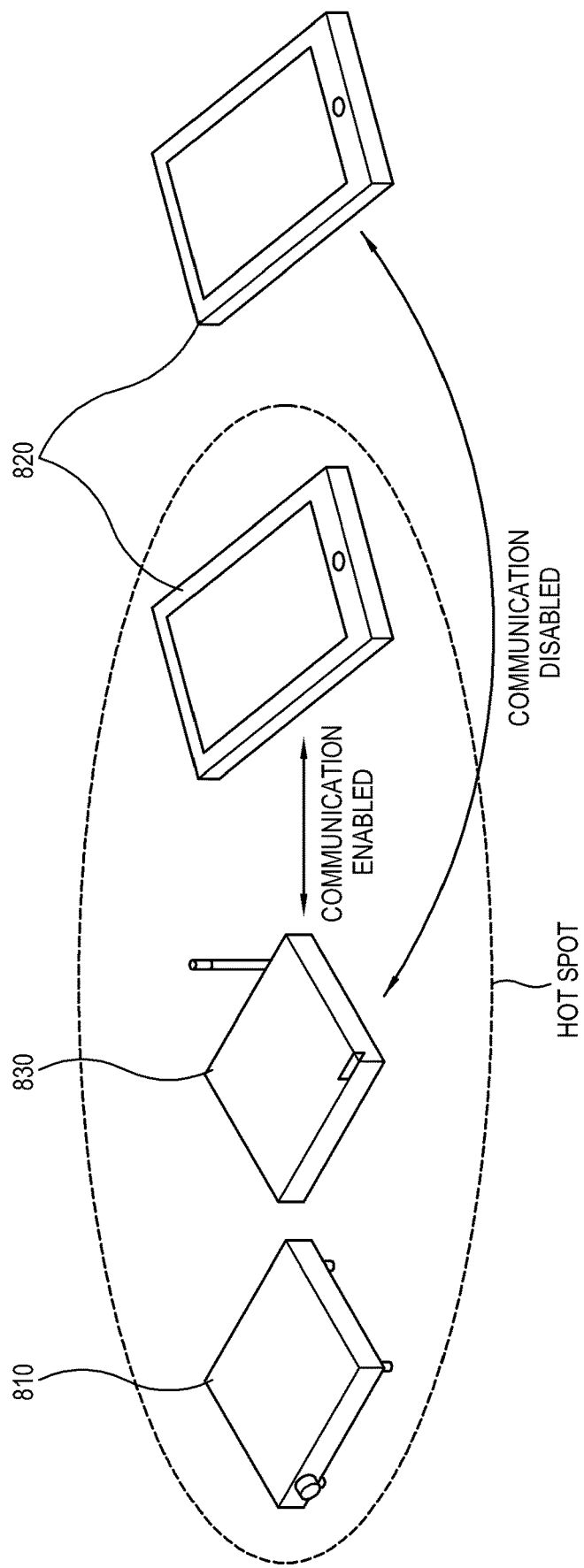
FIG. 15 illustrates a principle of determining whether a display apparatus according to a third exemplary embodiment is currently placed within an installation zone of an image capturing apparatus.

FIG. 15 illustrates a principle of determining whether a display apparatus according to a third exemplary embodiment is currently placed within an installation zone of an image capturing apparatus;

As shown in FIG. 15, a system according to the third exemplary embodiment includes an image capturing apparatus 810, a display apparatus 820, and an AP 830. The image capturing apparatus 810 and the display apparatus 820 are equivalent to those of the foregoing exemplary embodiments, and therefore detailed descriptions thereof will be omitted.

The AP 830 forms a hot spot within a zone of a preset range with the AP 830 as a center. If a certain device is desired to access the AP 830 and connect with the Internet through the AP 830, this device should be located within the hot spot. Likewise, the display apparatus 820 has to be located within the hot spot in order to access the AP 830. In other words, if the display apparatus 820 gets out of the hot spot, the display apparatus 820 cannot access the AP 830.

The image capturing apparatus 810 is also located within the hot spot since it has to communicate with the AP 830. Therefore, if the display apparatus 820 is located within the hot spot, it is regarded that the display apparatus 820 is placed within the installation zone of the image capturing apparatus 810. On the other hand, if the display apparatus 820 gets out of the hot spot, the display apparatus 820 is not placed within the installation zone of the image capturing apparatus 810.

Therefore, when the display apparatus 820 receives the notification message from the image capturing apparatus 810, the display apparatus 820 determines whether to access the AP 830.

If the display apparatus 820 can access the AP 830, the display apparatus 820 is currently placed within the installation zone of the image capturing apparatus 810, and therefore the image capturing apparatus 810 does not have to function as the CCTV. In this case, the display apparatus 820 does not approve of the photographing operation of the image capturing apparatus 810.

On the other hand, if the display apparatus 820 cannot access the AP 830, the display apparatus 820 is not placed within the installation zone of the image capturing apparatus 810, and therefore the image capturing apparatus 810 has to function as the CCTV. In this case, the display apparatus 820 automatically approves of the photographing operation of the image capturing apparatus 810.

Here, there are many grounds for determining whether the display apparatus 820 can access the AP 830. For example, the display apparatus 820 may determine whether to the SSID of the AP 830 is searched in the currently accessible wireless network. If the SSID of the AP 830 is searched, the display apparatus 820 can access the AP 830. On the other hand, if the SSID of the AP 830 is not searched, the display apparatus 820 is not accessible to the AP 830.

Figure 16:
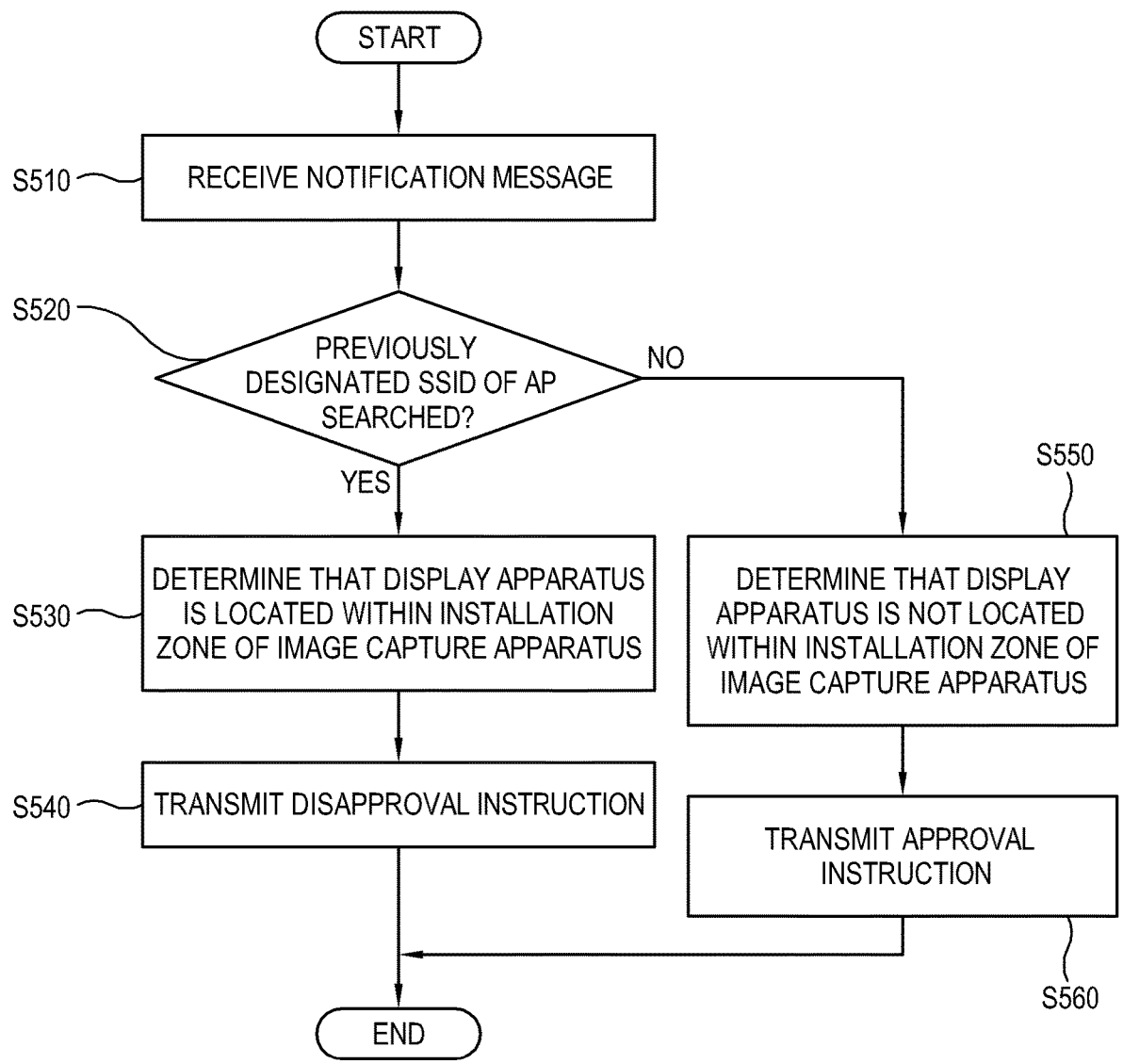
FIG. 16 is a flowchart that the display apparatus according to the third exemplary embodiment selects whether to give approval in response to a request for a notification message from the image capturing apparatus

FIG. 16 is a flowchart that the display apparatus according to the third exemplary embodiment selects whether to give approval in response to a request for a notification message from the image capturing apparatus As shown in FIG. 16, at operation S510 the display apparatus receives a notification message from the image capturing apparatus.

At operation S520 the display apparatus determines whether the SSID of the AP previously designated in the wireless network environment corresponding to the current location is searched.

If the previously designated SSID of the AP is searched, it is determined at operation S530 the display apparatus is located within the installation zone of the image capturing apparatus. Thus, at operation S540 the display apparatus transmits the disapproval instruction to the image capturing apparatus in response to the notification message.

On the other hand, if the previously designated SSID of the AP is not searched, it is determined at operation S550 that the display apparatus is not located within the installation zone of the installation zone of the image capturing apparatus. Thus, at operation S560 the display apparatus transmits the approval instruction to the image capturing apparatus in response to the notification message.

By this method, the display apparatus can determine whether to approve of the notification message in accordance with the current location.

Figure 17:
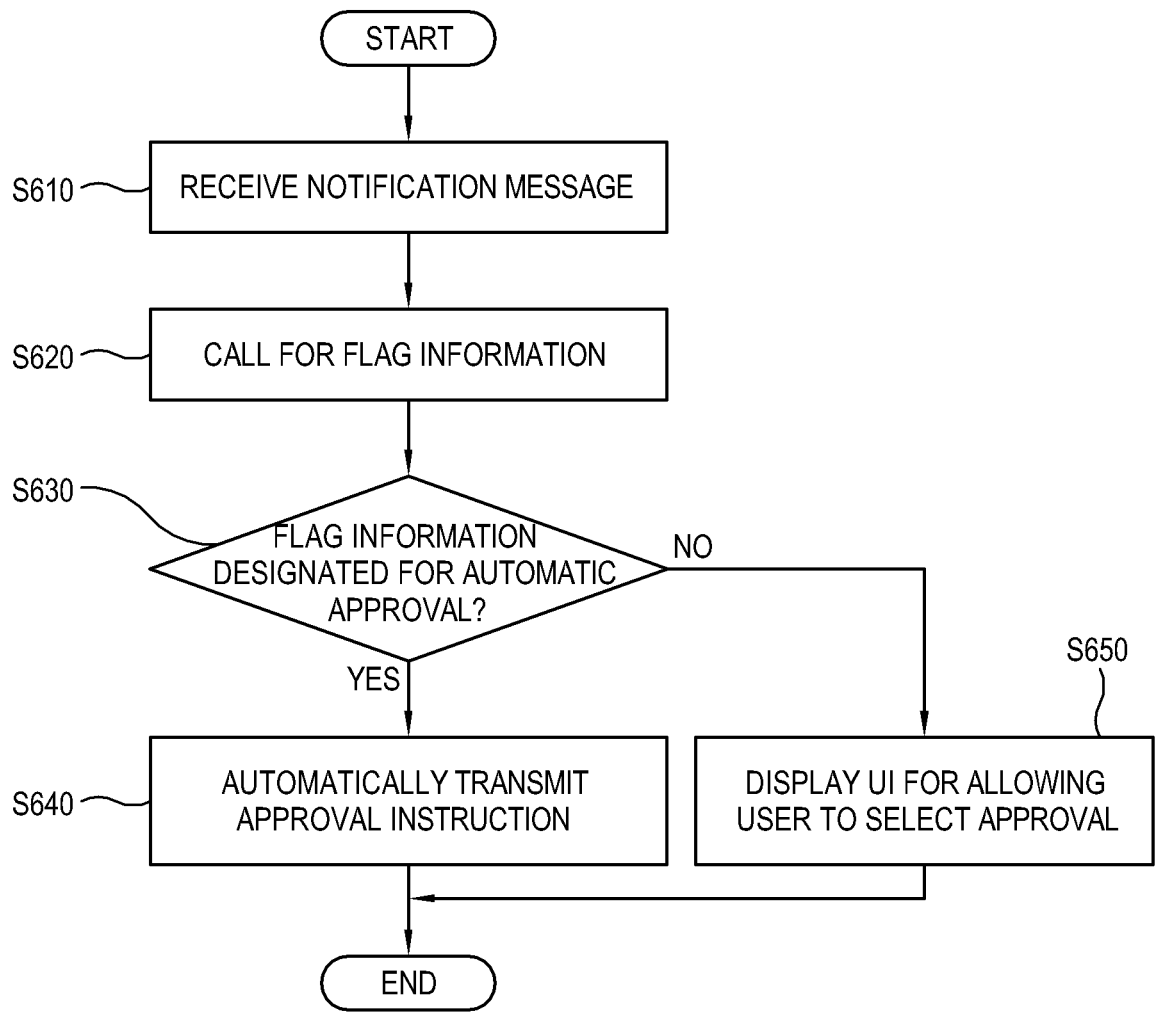
FIG. 17 is a flowchart that a display apparatus according to a fourth exemplary embodiment selects whether to give approval in response to a request for a notification message from an image capturing apparatus.

FIG. 17 is a flowchart that a display apparatus according to a fourth exemplary embodiment selects whether to give approval in response to a request for a notification message from an image capturing apparatus;

As shown in FIG. 17, at operation S610 the display apparatus receives the notification message from the image capturing apparatus At operation S620 the display apparatus calls for previously designated flag information. Such flag information is previously set and store in the display apparatus.

At operation S630 the display apparatus determines whether the automatic approval is designated in the called flag information.

If the automatic approval is designated in the flag information, at operation S640 the display apparatus automatically transmits the approval instruction to the image capturing apparatus in response to the notification message.

On the other hand, if the automatic approval is not designated in the flag information, at operation S650 the display apparatus displays a UI for allowing a user to select whether to give approval.

In the foregoing exemplary embodiments, the image capturing apparatus includes the first communicator and enters the notification mode in order to photograph an object in accordance with a user's approval instruction. However, the present inventive concept is not limited to the foregoing exemplary embodiments. Alternatively, the method of reducing the consumption of the battery power may be applied even though the image capturing apparatus is designed to operate by itself without receiving a user's approval instruction.

Figure 18:
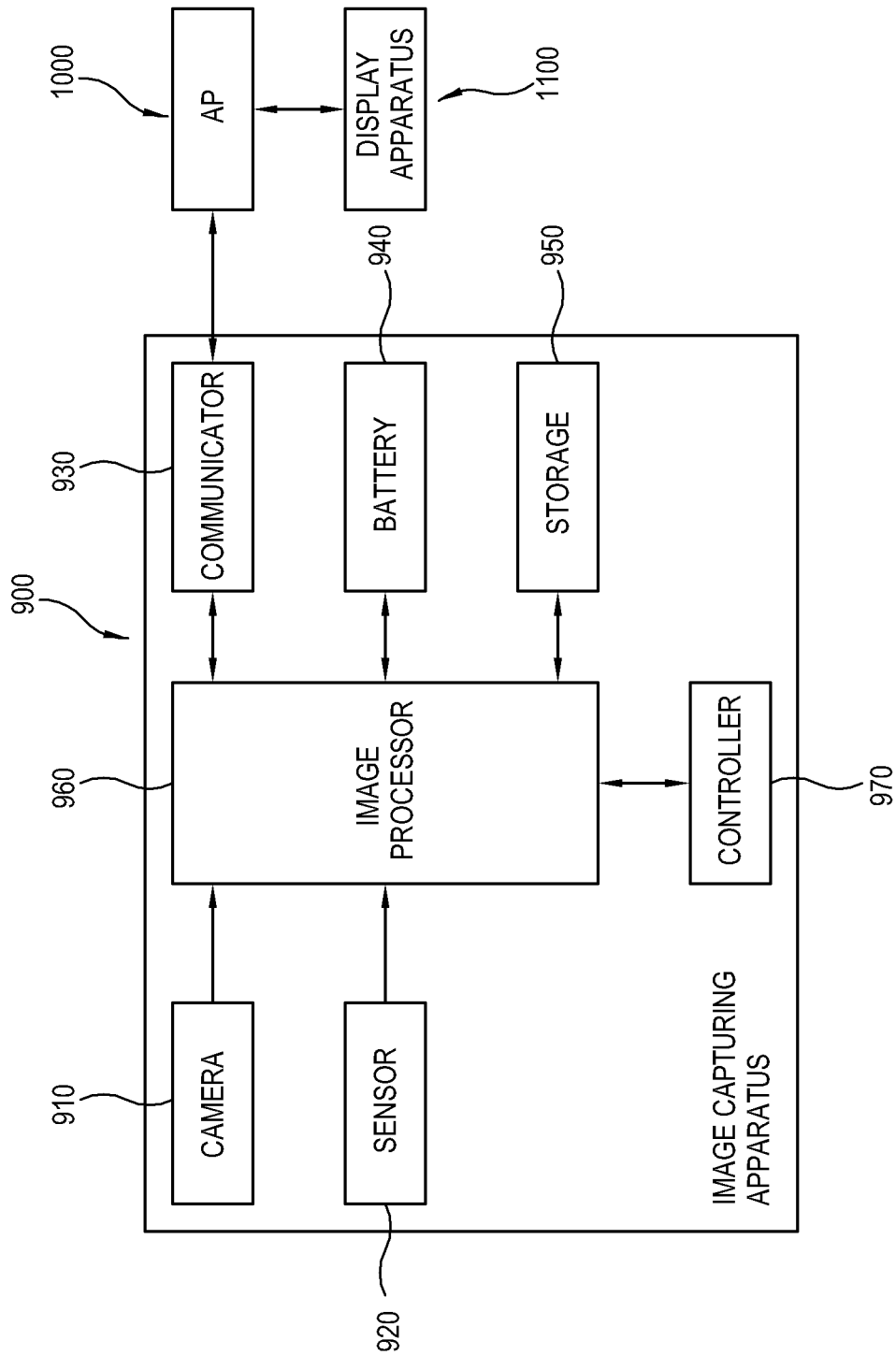
FIG. 18 is a block diagram of an image capturing apparatus according to a fifth exemplary embodiment.

FIG. 18 is a block diagram of an image capturing apparatus 900 according to a fifth exemplary embodiment.

As shown in FIG. 18, the image capturing apparatus 900 according to the fifth exemplary embodiment includes a camera 910, a sensor 920, a communicator 930, a battery 940, a storage 950, an image processor 960 and a controller 970. These elements of the image capturing apparatus 900 perform basically the same functions as those of the foregoing exemplary embodiments, and thus detailed descriptions thereof will be omitted.

The communicator 930 performs communication based on a communication protocol for transmitting image data, e.g. Wi-Fi, like the first communicator of the second exemplary embodiment. The communicator 930 can communicate with the display apparatus 1100 through an AP 1000.

The controller 970 may control the image capturing apparatus 900 to operate in one of the standby mode, the image capture mode and the image streaming mode. These modes are basically the same as those of the foregoing second exemplary embodiment. However, the image capturing apparatus 900 in this embodiment does not operate in the notification mode on the contrary to that of the second exemplary embodiment, i.e. does not transmit the notification message to the display apparatus 1100 in response to a motion of an object sensed by the sensor 920.

In this embodiment, the image capturing apparatus 900 automatically starts a photographing operation regardless of a user's approval instruction when the sensor 920 generates a sense signal.

Figure 19:
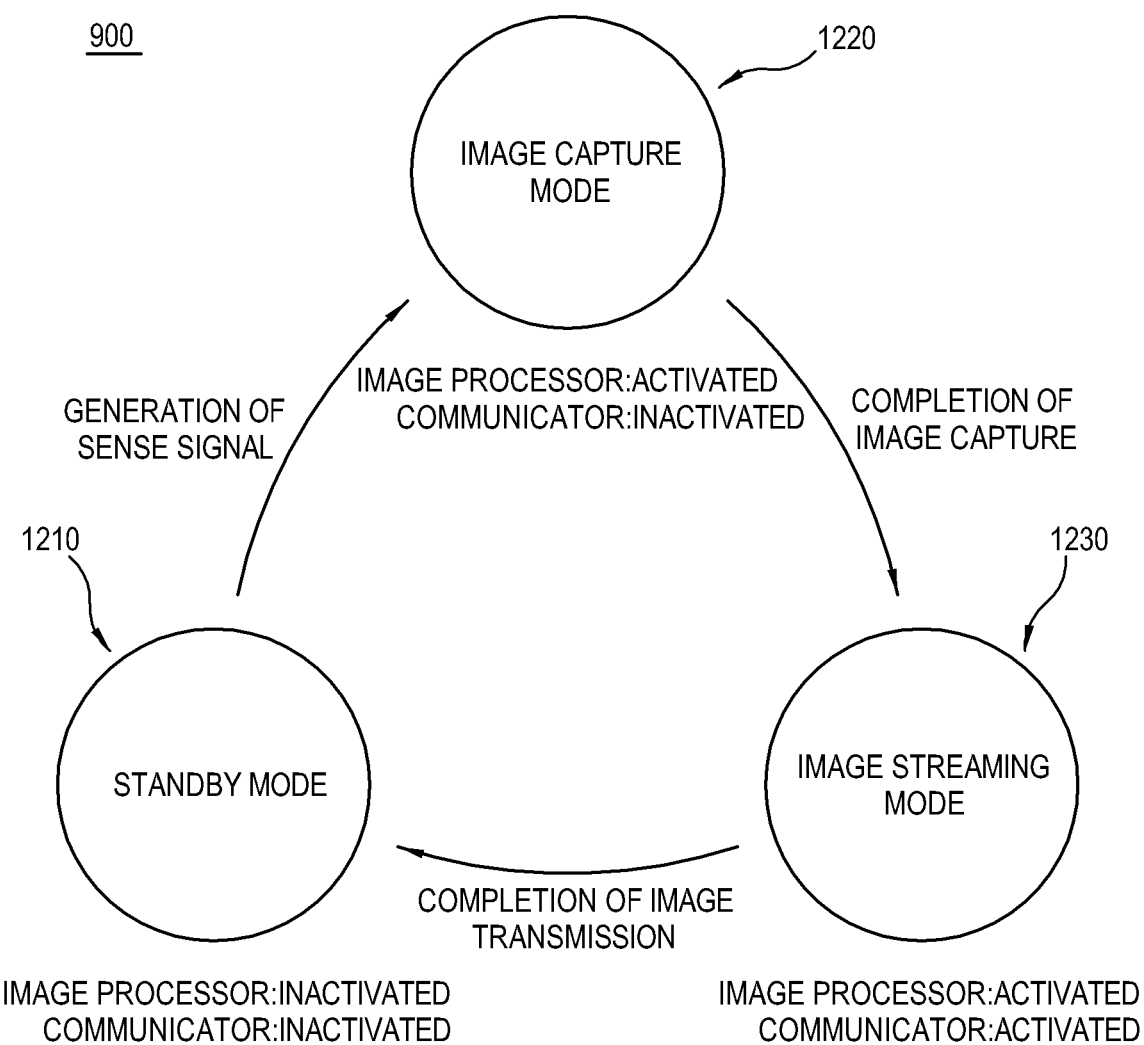
FIG. 19 illustrates modes that the image capturing apparatus according to the fifth exemplary embodiment enters in response to specific events, respectively.

FIG. 19 illustrates the modes that the image capturing apparatus 900 according to the fifth exemplary embodiment enters in response to specific events, respectively;

As shown in FIG. 19, the image capturing apparatus 900 switches over between a standby mode 1210, an image capture mode 1220 and an image streaming mode 1230 in accordance with preset events. In an initial status, the image capturing apparatus 900 operates in the standby mode 1210 where the least power is consumed. During the standby mode 1210, the image processor and the communicator are both inactivated.

If the sensor generates a sense signal by sensing a motion of an object during the standby mode 1210, the image capturing apparatus 900 switches over from the standby mode 1210 to the image capture mode 1220. During the image capture mode 1220, the image processor is activated but the communicator is inactivated.

During the image capture mode 1220, the image capturing apparatus 900 photographs the object through the camera to generate the photographed image data, and stores it.

In the image capture mode 1220, if an image is captured for a preset period of time, i.e. if the photographed image data corresponding to the object photographed for a preset period of time is generated and stored, the image capturing apparatus 900 switches over from the image capture mode 1220 to the image streaming mode 1230. During the image streaming mode 1230, both the image processor and the communicator are kept activated.

During the image streaming mode 1230, the image capturing apparatus 900 transmits the photographed image data stored in the image capture mode 1220 to the display apparatus.

If the transmission of the photographed image data is completed, the image capturing apparatus 900 switches over from the image streaming mode 1230 to the standby mode 1210.

In response to various events as described above, the image capturing apparatus 900 switches over between the modes and performs the operations designated according to the modes.

Below, a process of controlling the image capturing apparatus 900 according to an exemplary embodiment will be described.

Figure 20:
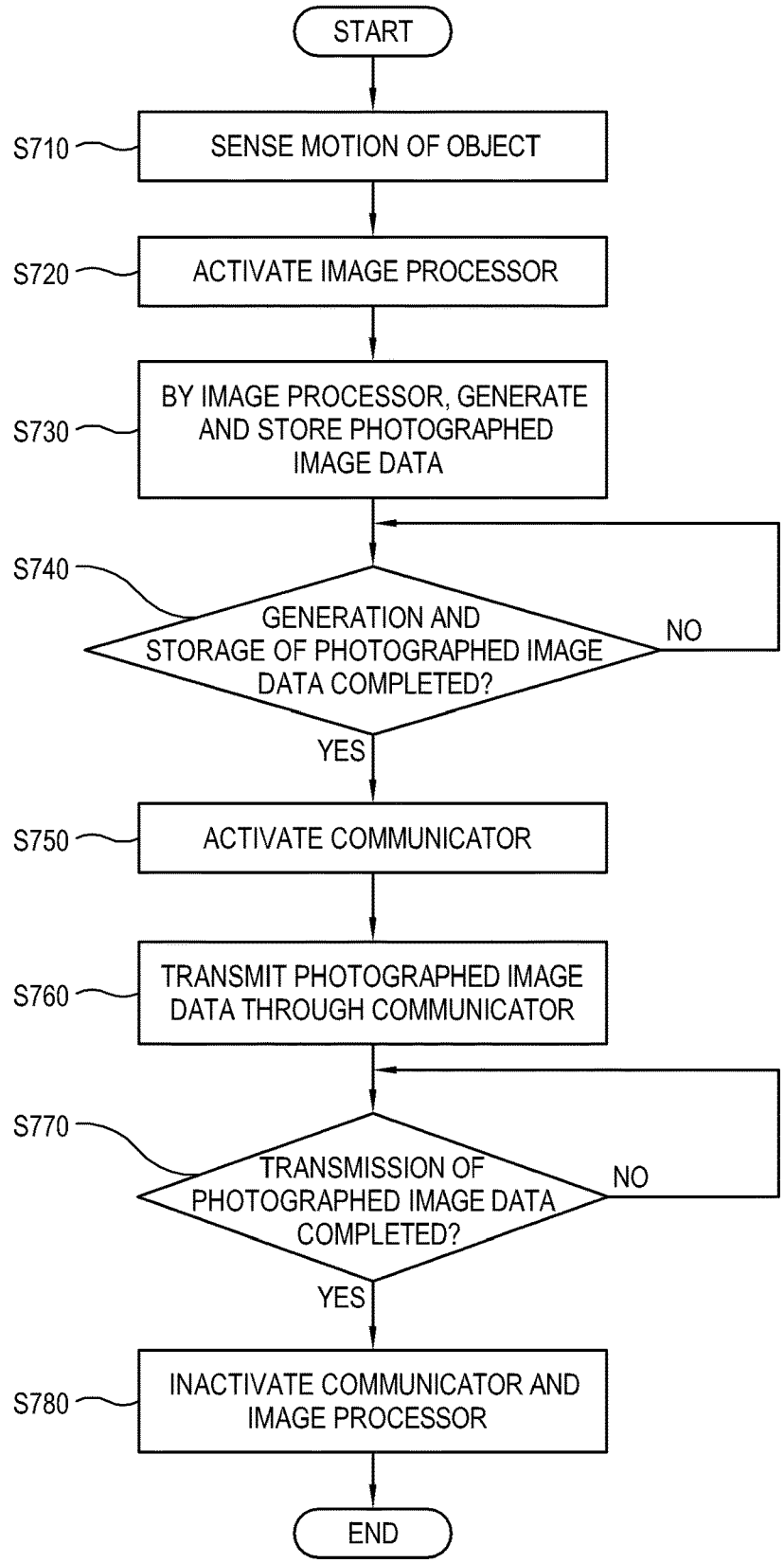
FIG. 20 is a flowchart of controlling the image capturing apparatus according to the fifth exemplary embodiment.

FIG. 20 is a flowchart of controlling the image capturing apparatus according to the fifth exemplary embodiment.

As shown in FIG. 20, at operation S710 the senor senses a motion of an object while the image capturing apparatus is in the standby mode.

At operation S720 the image capturing apparatus switches over to the image capture mode, and activates the image processor.

At operation S730 the image capturing apparatus photographs the object through the camera, generates photographed image data by the image processor and stores the photographed image data in the storage.

At operation S740 the image capturing apparatus determines whether the generation and storage of the photographed image data are completed. If the generation and storage of the photographed image data are not completed, monitoring is continued until the generation and storage are completed.

When the generation and storage of the photographed image data are completed, at operation S750 the image capturing apparatus switches over to the image streaming mode and activates the communicator. In this exemplary embodiment, the communicator performs communication based on the Wi-Fi protocol.

At operation S760 the image capturing apparatus transmits the stored photographed image data to the display apparatus through the communicator.

At operation S770 the image capturing apparatus determines whether the transmission of the photographed image data is completed. If the transmission of the photographed image data is not continued, monitoring is continued until the transmission is completed.

When the transmission of the photographed image data is completed, at operation S780 the image capturing apparatus switches over to the standby mode and inactivates the communicator and the image processor.

With this operations, the image capturing apparatus minimizes the consumption of the battery power and relatively prolongs the lasting time of the battery even while photographing the object and transmitting the data of the photographed image to the display apparatus.

In the foregoing second exemplary embodiment, two communication chips, i.e. the first communicator for transmitting the photographed image data and the second communicator for transmitting the notification message, are provided in the image capturing apparatus. In accordance with the amount of data to be transmitted, the first communicator transmits more amount of data per unit time than and consumes more power than the second communicator. For example, the first communicator is a Wi-Fi based communication chip, and the second communicator is a Zigbee based communication chip.

Alternatively, a single communicator may be designed to selectively operate in one of the Wi-Fi based communication mode and the Zigbee based communication mode. The present inventive concept may be applied to the image capturing apparatus with this structure, and this will be embodied in the following description.

Figure 21:
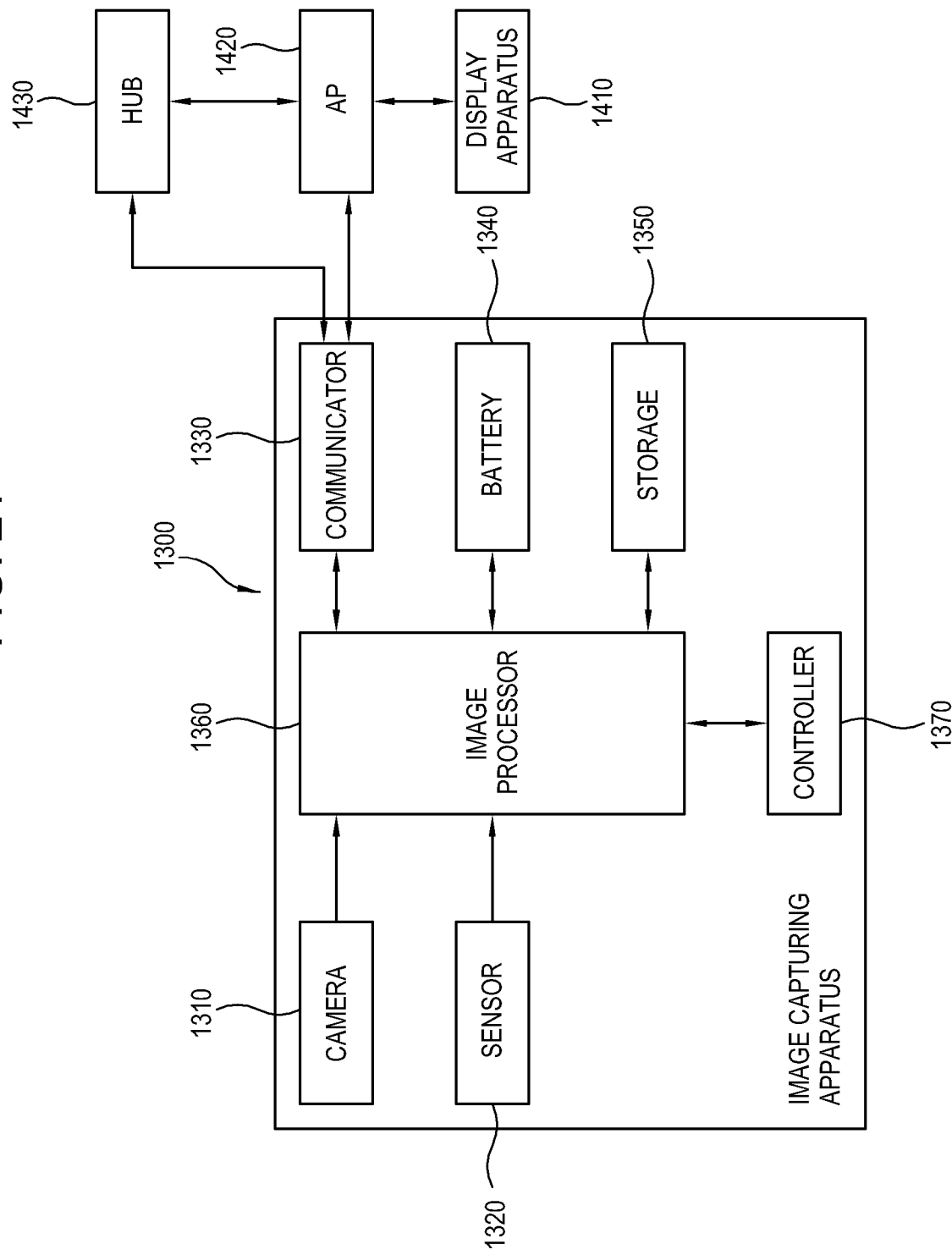
FIG. 21 is a block diagram of an image capturing apparatus according to a sixth exemplary embodiment.

FIG. 21 is a block diagram of an image capturing apparatus 1300 according to a sixth exemplary embodiment.

As shown in FIG. 21, the image capturing apparatus 1300 according to the sixth exemplary embodiment includes a camera 1310, a sensor 1320, a communicator 1330, a battery 1340, a storage 1350, an image processor 1360 and a controller 1370. These elements of the image capturing apparatus 13900 perform basically the same functions as those of the foregoing exemplary embodiments, and thus detailed descriptions thereof will be omitted.

On the contrary to the foregoing communicators of supporting only one protocol, the communicator 1330 in this embodiment supports a plurality of protocols. The communicator 1330 performs communication based on one among the plurality of protocols in response to the preset event.

For example, the communicator 1330 may operate in either of the Wi-Fi based communication mode of the Wi-Fi communication protocol or the Zigbee based communication mode of the Zigbee communication protocol. The communicator 1330 operates like a general Wi-Fi communication chip in the Wi-Fi based communication mode, or operates like a general Zigbee communication chip in the Zigbee based communication mode.

That is, the communicator 1330 in the Wi-Fi based communication mode transmits more amount of data per unit time than and consumes more power than the communicator 1330 in the Zigbee based communication mode. Therefore, the communicator 1330 consumes the least power when it is inactivated, consumes the next highest power when it is Zigbee based communication mode, and consumes the most power when it is the Wi-Fi based communication mode.

The communicator 1330 directly accesses the AP 1420 according to the Wi-Fi communication protocol in the Wi-Fi based communication mode and communicates with the display apparatus 1410. On the other hand, the communicator 1330 performs communication according to the Zigbee communication protocol in the Zigbee based communication mode and thus accesses the AP 1420 via a hub 1430.

Below, it will be described that the image capturing apparatus 1300 according to an exemplary embodiment switches over between the plurality of preset modes in response to a specific event.

FIG. 22 illustrates a plurality of modes for the image capturing apparatus according to the sixth exemplary embodiment, and activated statuses of elements in the image capturing apparatus according to the modes.

As shown in FIG. 22, the image capturing apparatus may operate in one among the standby mode, the notification mode, the image capture mode and the image streaming mode, and switch over between the modes in response to the preset event. The standby mode, the notification mode, the image capture mode and the image streaming mode are equivalent to those described above, and thus repetitive descriptions thereof will be avoided.

In the standby mode, the communicator and the image processor are all inactivated.

In the notification mode, the image processor is inactivated, but the communicator enters the Zigbee based communication mode. In the notification mode, the notification message has to be transmitted from the image capturing apparatus to the display apparatus via the communicator, and therefore the communicator does not have to switch over to the Wi-Fi based communication mode of consuming much power.

In the image capture mode, the image processor is activated, and the communicator operates in the Zigbee based communication mode.

In the image streaming mode, the image processor is activated, and the communicator switches over from the Zigbee based communication mode to the Wi-Fi based communication mode. During the image streaming mode, the communicator has to transmit the data of the photographed image, and therefore such data is hardly transmitted under the Zigbee based communication mode in which the amount of data to be transmitter per unit time is relatively low. Thus, the communicator switches over to the Wi-Fi based communication mode to transmit the data of the photographed image.

In the following, the events for switching the modes of the image capturing apparatus are substantially the same as those of the second exemplary embodiment.

In brief, the switchover from the standby mode to the notification mode is performed in response to a sense signal received from the sensor sensing a motion of an object.

The switchover from the notification mode to the image capture mode is performed by the approval instruction that is received from the display apparatus in response to the notification message transmitted from the image capturing apparatus to the display apparatus during the notification mode.

The switchover from the notification mode to the standby mode is performed when the approval instruction to the notification message is not received from the display apparatus within a preset period of time or when the disapproval instruction to the notification message is received from the display apparatus.

The switchover from the image capture mode to the image streaming mode is performed in response to completion of image capture, i.e. completion of generating and storing the data of the photographed image by the image processor due to the photographing operation of the camera.

The switchover from the image streaming mode to the standby mode is performed when the data of the photographed image is completely transmitted from the image capturing apparatus to the display apparatus.

Below, a method of controlling the image capturing apparatus in this embodiment will be described.

Figure 23:
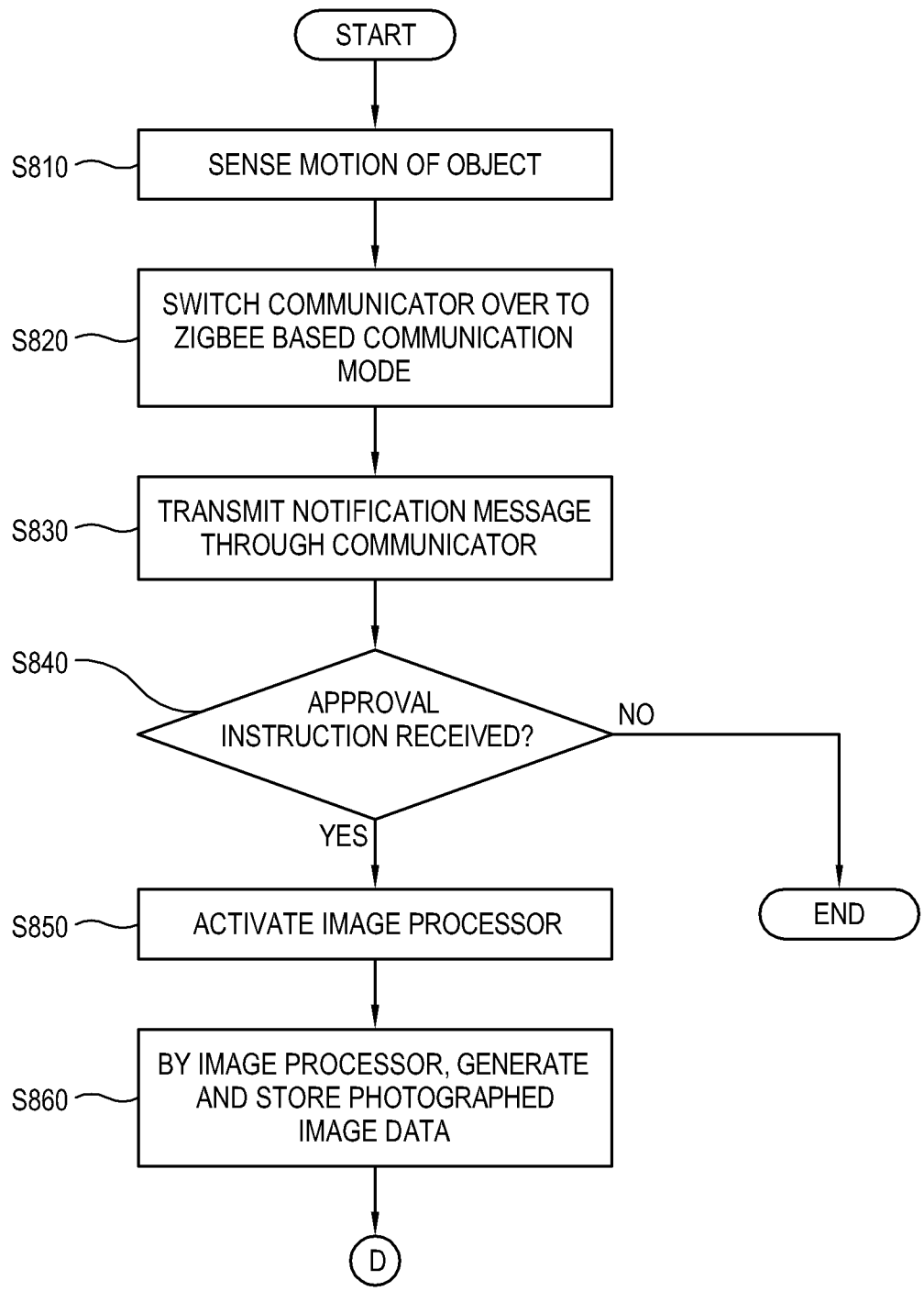
FIG. 23 and FIG. 24 are a flowchart of controlling the image capturing apparatus according to the sixth exemplary embodiment.
Figure 24:
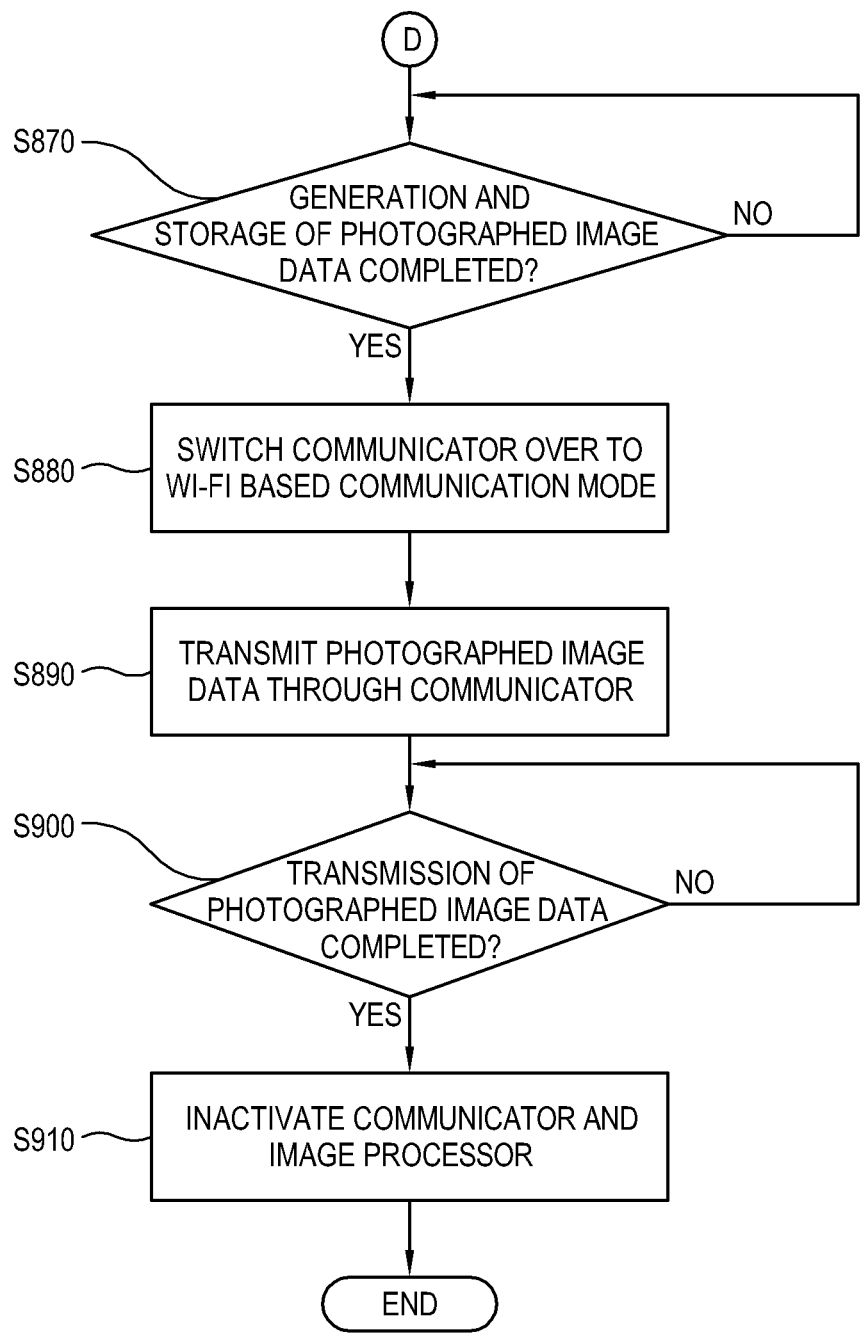

FIG. 23 and FIG. 24 are a flowchart of controlling the image capturing apparatus according to the sixth exemplary embodiment.

As shown in FIG. 23, at operation S810 the sensor senses a motion of an object while the image capturing apparatus is in the standby mode.

At operation S820 the image capturing apparatus switches over to the notification mode, and the communicator switches over to the Zigbee based communication mode.

At operation S830 the image capturing apparatus transmits the notification message to the display apparatus via the communicator. The notification message includes a request for approval of whether the image capturing apparatus photographs an object and transmits the photographed image data to the display apparatus.

At operation S840 the image capturing apparatus determines whether the communicator receives an approval instruction to the notification message from the display apparatus within a preset period of time. If the communicator does not receive the approval instruction from the display apparatus or receives a disapproval instruction from the display apparatus, the image capturing apparatus stops this process.

On the other hand, if the communicator receives the approval instruction from the display apparatus within a preset period of time, at operation S850 the image capturing apparatus switches over to the image capture mode and activates the image processor.

At operation S860 the image capturing apparatus photographs the object through the camera, generates the photographed image data by the image processor, and stores the photographed image data in the storage.

As shown in FIG. 24, at operation S870 the image capturing apparatus determines whether the generation and storage of the photographed image data are completed. If the generation and storage of the photographed image data are not completed, monitoring is continued until the generation and storage are completed.

When the generation and storage of the photographed image data are completed, at operation S880 the image capturing apparatus switches over to the image streaming mode and the communicator switches over to the Wi-Fi based communication mode.

At operation S890 the image capturing apparatus transmits the stored photographed image data to the display apparatus through the communicator.

At operation S900 the image capturing apparatus determines whether the transmission of the photographed image data is completed. If the transmission of the photographed image data is not completed, monitoring is continued until the transmission is completed.

When the transmission of the photographed image data is completed, at operation S910 the image capturing apparatus switches over to the standby mode and inactivates the communicator and the image processor.

With this operation, the image capturing apparatus minimizes the consumption of the battery power and relatively prolongs the lasting time of the battery even while photographing the object and transmitting the data of the photographed image to the display apparatus.

In the foregoing exemplary embodiments, the present inventive concept is embodied by the image capturing apparatus of photographing the object through the camera, but not limited thereto. Alternatively, the present inventive concept may be applied to not the image capturing apparatus but a general-purpose electronic apparatus, and this will be embodied as follows.

Figure 25:
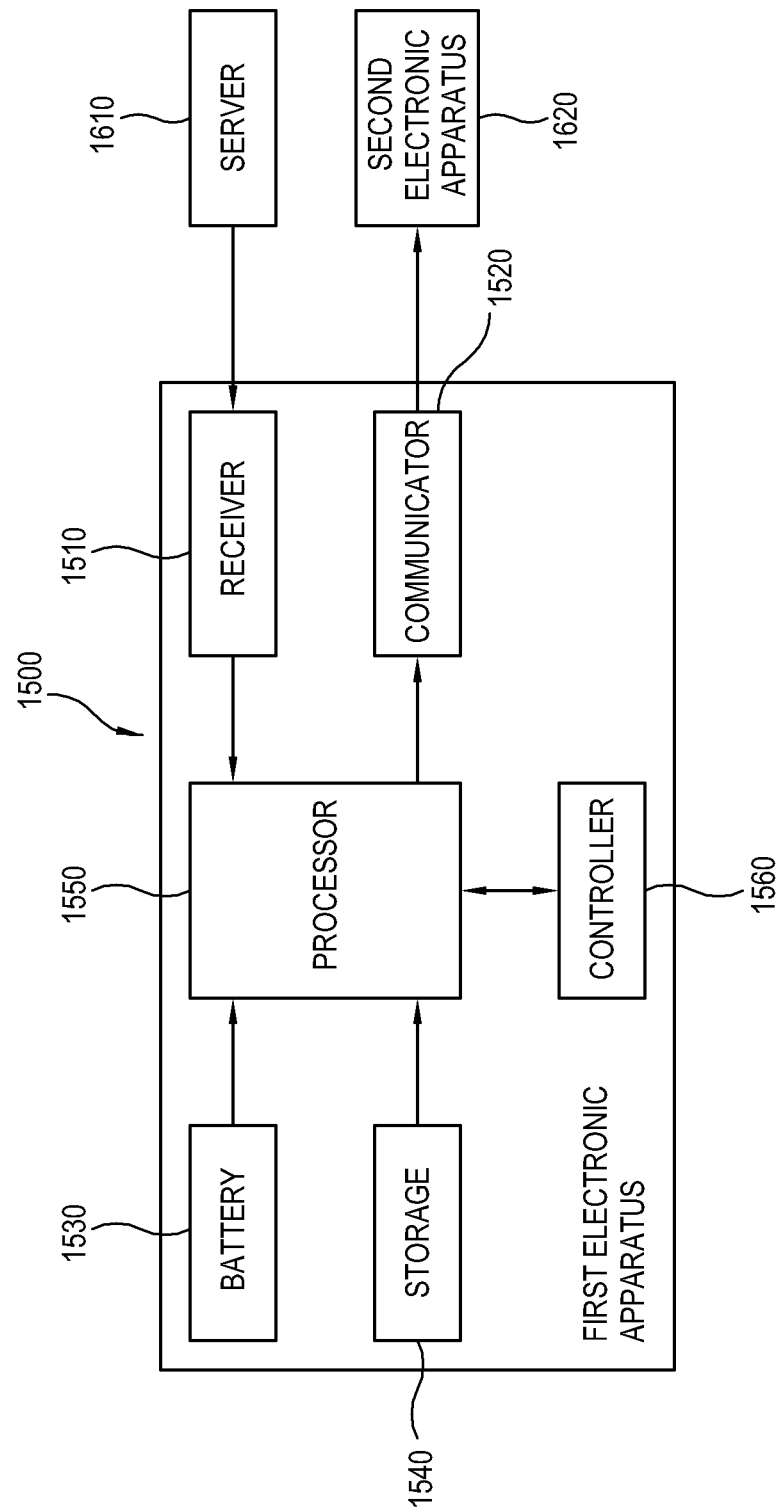
FIG. 25 is a block diagram of an electronic apparatus according to a seventh exemplary embodiment.

FIG. 25 is a block diagram of an electronic apparatus according to a seventh exemplary embodiment.

As shown in FIG. 25, a system according to the seventh exemplary embodiment includes a first electronic apparatus 1500 which receives content data from a server 1610, and a second electronic apparatus 1620 which receives and processes the content data from the first electronic apparatus 1500 and displays a content image.

The first electronic apparatus 1500 includes a receiver 1510 for receiving the content data from the server 1610, a communicator 1520 for wireless communication with the second electronic apparatus 1620, a battery 1530 for supplying operation power to the first electronic apparatus 1500, a storage 1540 for storing data, a processor 1550 for processing the content data, and a controller 1560 for controlling operations of the processor 1550.

The first electronic apparatus 1500 for example relays the content data from the server 1610 to the second electronic apparatus 1620. In this exemplary embodiment, the first electronic apparatus 1500 receives the operation power from the built-in battery 1530 and performs wireless communication with the second electronic apparatus 1620 because of various reasons such as restriction of installation environments, convenience in use, etc. In this case, there is a need for minimizing consumption of battery power in the first electronic apparatus 1500.

Suppose that the operation of the first electronic apparatus 1500 to receive content data from the server 1610 and the operation of the first electronic apparatus 1500 to transmit the content data received from the server 1610 to the second electronic apparatus 1620 are performed together in real time. For example, if it takes 10 seconds to fully receive the content data from the server 1610, the image processor 1550 and the communicator 1520 are continuously activated for 10 seconds.

If the time taken in receiving the content data by the first electronic apparatus 1500 from the server 1610 is longer than the time taken in transmitting the content data by the first electronic apparatus 1500 to the second electronic apparatus 1620, the communicator 1520 actually operates for a time shorter than 10 seconds. For example, if the communicator 1520 is a chipset of supporting the Wi-Fi communication or the like capable of transmitting the content data such as an image, the consumption of the battery power increases as the time of activating the communicator 1520 becomes longer.

In this regard, the first electronic apparatus 1500 in this embodiment operates to reduce the power consumption of the battery 1530, and this will be described below.

Figure 26:
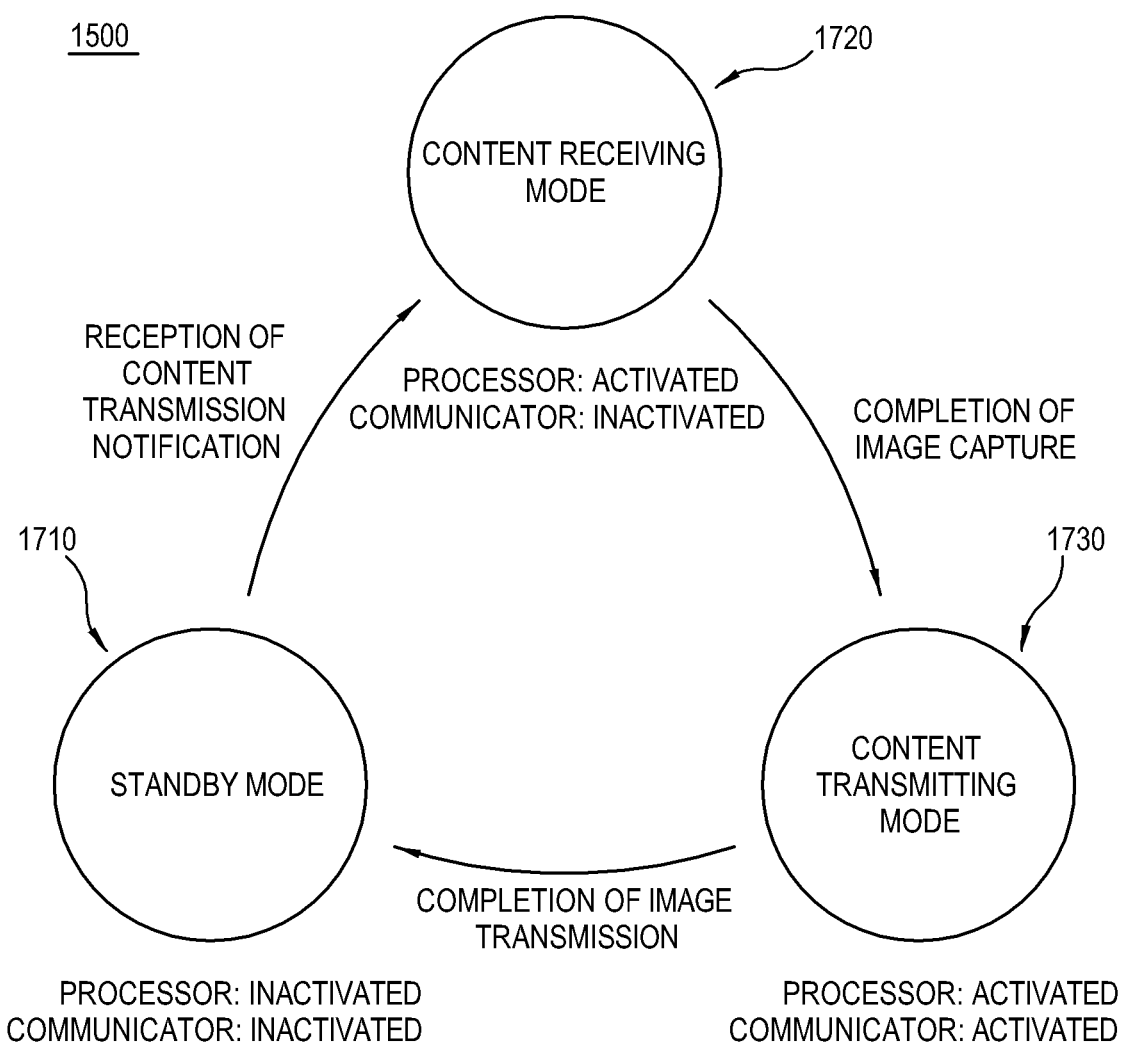
FIG. 26 illustrates modes that a first electronic apparatus according to the seventh exemplary embodiment enters in response to specific events, respectively.

FIG. 26 illustrates modes that a first electronic apparatus according to the seventh exemplary embodiment enters in response to specific events, respectively.

As shown in FIG. 26, the first electronic apparatus 1500 operates in one among a standby mode 1710, a content receiving mode 1720 and a content transmitting mode 1730 in response to a preset event.

In the standby mode 1710 the processor and the communicator are inactivated, and thus the first electronic apparatus 1500 consumes the least power. Basically, the standby mode 1710 is an initial status for the first electronic apparatus 1500. During the standby mode 1710, the receiver is activated for communication with the server.

If a content transmission notification from the server is received in the receiver 1510 during the standby mode 1710, the first electronic apparatus 1500 switches over from the standby mode 1710 to the content receiving mode 1720. Here, the content transmission notification may be transmitted from the server in the form of a push, or may be a reply to an inquiry of the first electronic apparatus 1500 that asks the server about whether there is content data to be received through the receiver.

Alternatively, the first electronic apparatus 1500 may switch over from the standby mode 1710 to the content receiving mode 1720 in response to a previously scheduled content acquiring event. Such an event may be set to be triggered at a preset point of time in the first electronic apparatus 1500, or may occur by a user's input or the like.

In the content receiving mode 1720, the content data is received from the server, and therefore the processor is activated but the communicator is inactivated. During the content receiving mode 1720 the processor processes the content data received from the server through the receiver and stores the processed content data in the storage. At this time, the content data is not transmitted from the first electronic apparatus to the second electronic apparatus, the communicator is kept inactivated.

If the content data received from the server is completely processed and stored, the first electronic apparatus 1500 switches over from the content receiving mode 1720 to the content transmitting mode 1730.

In the content transmitting mode 1730, the content data previously stored during the foregoing content receiving mode 1720 is transmitted to the second electronic apparatus through the communicator. Therefore, the processor and the communicator are activated during the content transmitting mode 1730.

If the content data is completely transmitted through the communicator, the first electronic apparatus 1500 switches over from the content transmitting mode 1730 to the standby mode 1710.

Like this, the first electronic apparatus 1500 inactivates the communicator for communication with the second electronic apparatus while receiving and storing the content data from the server, and activates the communicator to transmit the content data to the second electronic apparatus when the content data is completely stored. Thus, the time during which the communicator is activated is minimized, thereby reducing the consumption of the battery power.

Below, a method of controlling the first electronic apparatus according to an exemplary embodiment will be described.

Figure 27:
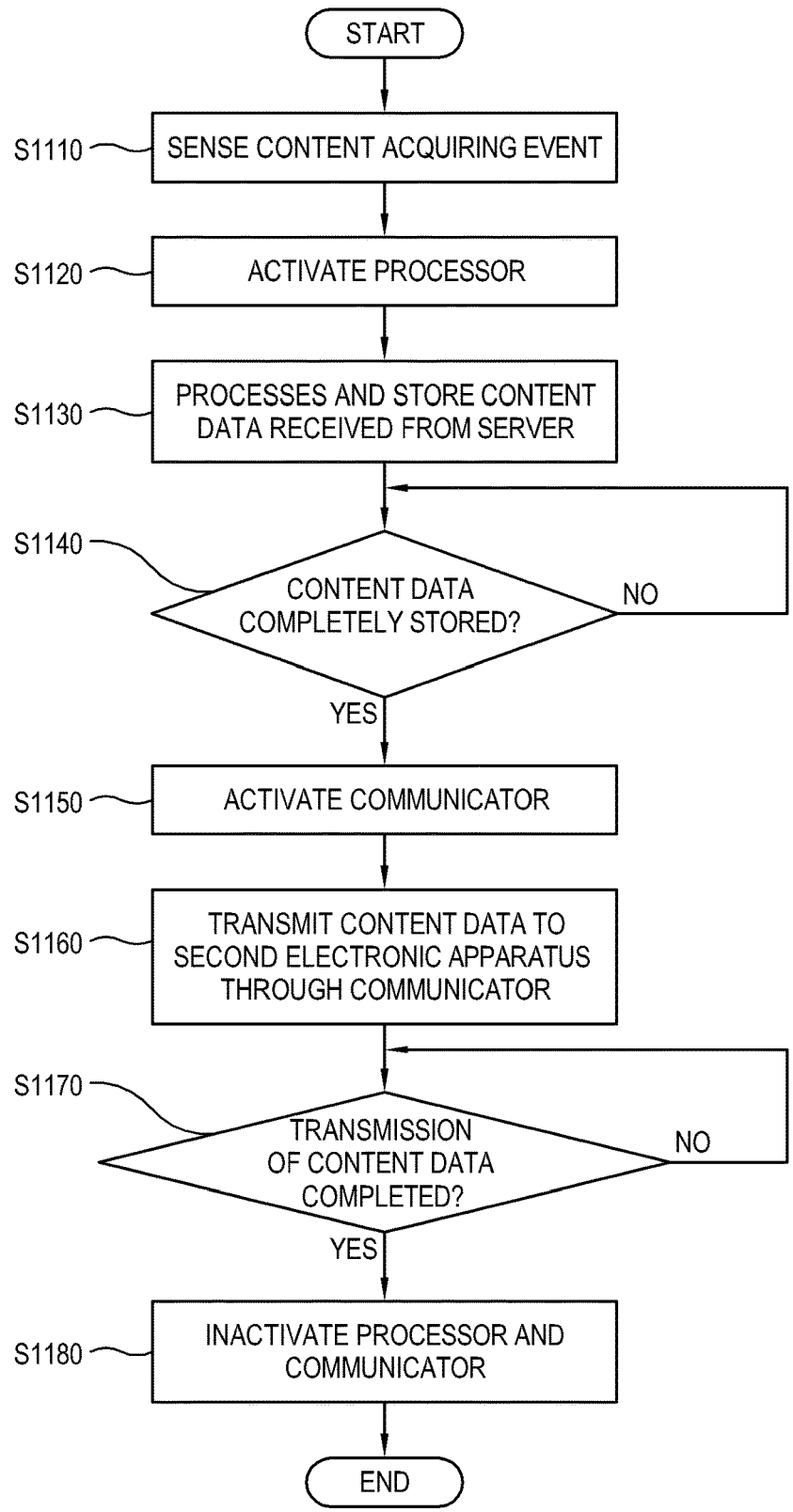
FIG. 27 is a flowchart of controlling the first electronic apparatus according to the seventh exemplary embodiment.

FIG. 27 is a flowchart of controlling the first electronic apparatus according to the seventh exemplary embodiment.

As shown in FIG. 27, at operation S1110 the first electronic apparatus senses a content acquiring event during the standby mode.

At operation S1120 the first electronic apparatus switches over to the content receiving mode and activates the processor.

At operation S1130 the first electronic apparatus receives and processes the content data from the server, and stores the processed content data.

At operation S1140 the first electronic apparatus determines whether the content data from the server is completely stored. If the content data is not completely stored, the first electronic apparatus continues monitoring until the storage of the content data is completed.

If it is determined that the storage of the content data is completed, at operation S1150 the first electronic apparatus switches over to the content transmitting mode and activates the communicator.

At operation S1160 the first electronic apparatus transmits the previously stored content data to the second electronic apparatus through the communicator.

At operation S1170 the first electronic apparatus determines whether the transmission of the content data is completed. If the transmission of the content data is not completed, the first electronic apparatus continues monitoring until the transmission of the content data is completed.

If it is determined that the transmission of the content data is completed, at operation S1180 the first electronic apparatus switches over to the standby mode and inactivates the processor and the communicator.

By this method, the first electronic apparatus in this embodiment can reduce consumption of the battery power consumption.

In the foregoing exemplary embodiments, the first communicator, the second communicator, the image processor and the like elements are in either of the activated status or the inactivated status. However, the status of the element is not limited to the activated or inactivated status. For example, the element may be in one of a first status and a second status. Here, the second status consumes less power than the first status, but the second status is not necessarily limited to the inactivated status.

The methods according to the foregoing exemplary embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the exemplary embodiments. The program command recorded in this storage medium may be specially designed and configured according to the exemplary embodiments, or may be publicly known and available to those skilled in the art of computer software.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. An image capturing apparatus comprising:
   a sensor configured to sense an object;
   a camera configured to take an image;
   a first communicator configured to communicate with an external apparatus, operate in a preset first status, and operate in a second status that consumes less power than the first status;
   a second communicator configured to communicate with the external apparatus, operate in a preset third status, and operate in a fourth status that consumes less power than the third status, and having a data transmission rate lower than that of the first communicator;
   at least one memory storing instructions; and at least one processor configured to execute the instructions to cause the image capturing apparatus to:
identify whether the sensor senses the object while the first communicator is in the second status and the second communicator is in the fourth status,
in response to the sensor having sensed the object, control the second communicator to switch over from the fourth status to the third status,
transmit, to the external apparatus through the second communicator, a request for an image taking instruction to take an image with the camera,
in response to the image capturing apparatus receiving the image taking instruction from the external apparatus through the second communicator, take an image using the camera and generate data of the image taken by the camera, and
control the first communicator to switch over from the second status to the first status so that the data of the image taken by the camera can be transmitted to the external apparatus through the first communicator.

2. The image capturing apparatus according to claim 1, wherein the at least one processor further is configured to control:
the first communicator to be activated when the first communicator is in the first status, and
the first communicator to be inactivated when the first communicator is in the second status.

3. The image capturing apparatus according to claim 1, wherein
the at least one processor includes an image processor to perform the generating the data of the image,
the image processor is configured to operate in a preset fifth status and in a sixth status that consumes less power than the fifth status, and
the image processor is in the sixth status while the camera is not taking an image.

4. The image capturing apparatus according to claim 3, wherein the at least one processor further is configured to control:
the image processor to be activated when the image processor is in the fifth status,
the image processor to be inactivated when the image processor is in the sixth status.

5. The image capturing apparatus according to claim 3, further comprising a storage,
wherein the at least one processor is configured to execute the instructions to cause the image capturing apparatus to:
maintain the first communicator in the second status in response to the image capturing apparatus receiving the image taking instruction, and
control the image processor to switch over to the fifth status, generate the data of the image taken by the camera, and store the generated data in the storage.

6. The image capturing apparatus according to claim 5, wherein the at least one processor is configured to execute the instructions to cause the image capturing apparatus to:
control the first communicator to switch over to the first status when the image data is completely stored in the storage, so that the image data stored in the storage can be transmitted to the external apparatus through the first communicator.

7. The image capturing apparatus according to claim 6, wherein the at least one processor is configured to execute the instructions to cause the image capturing apparatus to:
control the first communicator to switch over to the second status, and
control the image processor to switch over to the sixth status when the image data is completely transmitted through the first communicator.

8. The image capturing apparatus according to claim 1, wherein
the at least one processor is configured to execute the instructions to cause the image capturing apparatus to:
maintain the second communicator in the fourth status while the object has not been sensed by the sensor, and
control the second communicator to switch over to the third status in response to the sensor having sensed the object.

9. The image capturing apparatus according to claim 8, wherein the at least one processor is configured to control:
the second communicator to be activated when the second communicator is in the third status, and
the second communicator to be inactivated when the second communicator is in the fourth status.

10. The image capturing apparatus according to claim 8, wherein the at least one processor is configured to execute the instructions to cause the image capturing apparatus to:
control the second communicator to switch over to the fourth status if the instruction to the request is not received within a preset period of time.

11. The image capturing apparatus according to claim 1, wherein
the first communicator comprises a Wi-Fi communication module, and
the second communicator comprises a Zigbee communication module.

12. A system comprising:
an image capturing apparatus configured to photograph an object; and
a display apparatus configured to display an image by processing image data obtained by the image capturing apparatus photographing the object and received from the image capturing apparatus,
the image capturing apparatus comprising:
a sensor configured to sense the object;
a camera configured to take an image;
a first communicator configured to communicate with the display apparatus, operate in a preset first status, and operate in a second status that consumes less power than the first status;
a second communicator configured to communicate with the display apparatus, operate in a preset third status, and operate in a fourth status that consumes less power than the fifth status, and having a data transmission rate lower than that of the first communicator;
at least one memory storing instructions; and
at least one processor configured to execute the instructions to cause the image capturing apparatus to:
identify whether the sensor senses the object while the first communicator is in the second status and the second communicator is in the fourth status,
in response to the sensor having sensed the object, control the second communicator to switch over from the fourth status to the third status,
transmit, to the display apparatus through the second communicator, a request for an image taking instruction to take an image with the camera,
in response to the image capturing apparatus receiving the image taking instruction from the display apparatus through the second communicator, take an image using the camera and generate data of the image taken by the camera, and control the first communicator to switch over from the second status to the first status so that the data of the image taken by the camera can be transmitted to the display apparatus through the first communicator.

13. The system according to claim 12, wherein the display apparatus is configured to identify whether the display apparatus is located within an installation zone of the image capturing apparatus in response to the request from the image capturing apparatus, wherein the installation zone is a region with a preset size in which the image capturing apparatus is located, in response to identifying that the display apparatus is located within the installation zone, the display apparatus does not approve of the request, and in response to identifying that the display apparatus is not located within the installation zone, the display apparatus displays a user interface (UI) to allow a user to select whether to approve of the request.

14. The system according to claim 13, wherein the display apparatus is configured to identify that the display apparatus is located within the installation zone if a service set identifier (SSID) of an access point (AP) installed within the installation zone for communication with the image capturing apparatus is searched.

15. The system according to claim 12, wherein the display apparatus is configured to previously store flag information designed for whether to approve of the request for taking an image, and selectively send the image capturing apparatus an instruction to approve of taking an image based on the flag information in response to the request.

16. A method of controlling an image capturing apparatus having a first communicator configured to operate in a preset first status and operate in a second status that consumes less power than the first status, and a second communicator configured to operate in a preset third status and operate in a fourth status that consumes less power than the third status and having a lower data transmission rate than that of the first communicator, the method comprising:

sensing an object by a sensor of the image capturing apparatus while the first communicator is in the second status and the second communicator is in the fourth status;

switching the second communicator over from the fourth status to the third status, in response to the sensor sensing the object;

transmitting a request for an image taking instruction to take an image with a camera of the image capturing apparatus to an external apparatus through the second communicator, in response to the sensor sensing the object;

taking an image using the camera and controlling at least one processor of the image capturing apparatus to generate data of the image taken by the camera, in response to receiving an image taking instruction from the external apparatus through the second communicator; and switching the first communicator over from the second status to the first status so that the data of the image taken by the camera can be transmitted to the external apparatus through the first communicator.

17. The method according to claim 16, wherein the least one processor is configured to control:

the first communicator to be activated when the first communicator is in the first status, and the first communicator to be inactivated when the first communicator is in the second status.

18. The method according to claim 16, wherein the at least one processor includes an image processor to generate the data of the image, the image processor is configured to operate in a preset fifth status and in a sixth status that consumes less power than the fifth status, and the image processor is in the sixth status while the camera is not taking an image.

19. The method according to claim 18, wherein the least one processor is configured to control:

the image processor to be activated when the image processor in the fifth status, and the image processor to be inactivated when the image processor in the sixth status.

20. The method according to claim 18, wherein the controlling the at least one processor to generate the image data comprises:

maintaining the first communicator in the second status in response to the image taking instruction, and controlling the image processor to switch over to the fifth status, generate the data of the image taken by the camera and store the generated data in the storage.

* * * * *